US008600101B2

(12) United States Patent  
Sairyo

(10) Patent No.: US 8,600,101 B2
(45) Date of Patent: Dec. 3, 2013

(54) PORTRAIT ILLUSTRATION CREATION SYSTEM, CHARACTER CREATION SYSTEM, AND CREATED PORTRAIT ILLUSTRATION DISPLAY SYSTEM

(76) Inventor: Kazuo Sairyo, Amagasaki (JP)

( * ) Notice: Subject to any disclaimer, the term of this patent is extended or adjusted under 35 U.S.C. 154(b) by 195 days.

(21) Appl. No.: 13/146,981

(22) PCT Filed: Feb. 4, 2010

(86) PCT No.: PCT/JP2010/051612
§ 371 (c)(1),
(2), (4) Date: Jul. 29, 2011

(87) PCT Pub. No.: WO2010/090259
PCT Pub. Date: Aug. 12, 2010

(65) Prior Publication Data
US 2011/0280485 A1 Nov. 17, 2011

(30) Foreign Application Priority Data

Feb. 5, 2009 (JP) ................................ 2009-024940

(51) Int. Cl.
G06K 9/68 (2006.01)
G06T 11/00 (2006.01)

(52) U.S. Cl.
USPC ............................ 382/100; 382/118; 382/218

(58) Field of Classification Search
USPC ................. 382/100, 118, 190, 217, 218, 219; 345/467
See application file for complete search history.

(56) References Cited

U.S. PATENT DOCUMENTS

| 5,537,662 | A  | * | 7/1996 | Sato et al. | 715/860 |
| 5,572,656 | A  | * | 11/1996 | Iida et al. | 715/203 |
| 2002/0070945 | A1 | * | 6/2002 | Kage | 345/581 |
| 2003/0095701 | A1 | * | 5/2003 | Shum et al. | 382/155 |
| 2003/0146921 | A1 | * | 8/2003 | Taniguchi et al. | 345/629 |
| 2005/0212821 | A1 | * | 9/2005 | Xu et al. | 345/647 |
| 2009/0087035 | A1 | * | 4/2009 | Wen et al. | 382/118 |

FOREIGN PATENT DOCUMENTS

| JP | 10187931 A | * | 7/1998 |
| JP | 11-053386 A | | 2/1999 |
| JP | 11-085953 A | | 3/1999 |

(Continued)

OTHER PUBLICATIONS

International Search Report issued in PCT/JP2010/051612, mailed Apr. 6, 2010, with translation, 4 pages.

Primary Examiner — Jon Chang
(74) Attorney, Agent, or Firm — Osha Liang LLP

(57) ABSTRACT

A portrait illustration creation system includes a basic face photo data storage unit for storing a plurality of pieces of face photo data of basic faces, a basic portrait illustration data storage unit for storing a plurality of basic portrait illustrations, and an associating information storage unit for storing information which associates the basic face photo data with the basic portrait illustration data. The system also includes an approximate basic face photo extraction unit for recognizing, from face-photo-data-to-be-illustrated which is a photo of a face-to-be-illustrated of which a portrait illustration is desired to be created, the face-to-be-illustrated; performing matching between the face-to-be-illustrated and the basic faces represented by the plurality of pieces of basic face photo data stored on the basic face photo data storage unit; and extracting the basic face photo data having a high approximation degree.

16 Claims, 16 Drawing Sheets

(56) References Cited

FOREIGN PATENT DOCUMENTS

| JP | 2001-292305 A | 10/2001 |
| JP | 2003-203221 A | 7/2003 |
| JP | 2005-032163 A | 2/2005 |
| JP | 2008-310636 A | 12/2008 |

* cited by examiner

FIG.2A

BASIC FACE MANAGEMENT TABLE 51

| BASIC FACE ID | BASIC FACE PHOTO ID | HEAD AREA FEATURE PATTERN ID | FACE AREA FEATURE PATTERN ID | BASIC PORTRAIT ILLUSTRATION ID |
|---|---|---|---|---|
| B001 | BP001 | TA001 | TB001 | BI001 |
| B002 | BP002 | TA002 | TB002 | BI002 |
| B003 | BP003 | TA003 | TB003 | BI003 |
| B004 | BP004 | TA004 | TB004 | BI004 |
| B005 | BP005 | TA005 | TB005 | BI005 |
| ⋮ | ⋮ | ⋮ | ⋮ | ⋮ |

FIG.2B

FIRST BASIC FACIAL PART MANAGEMENT TABLE 52

| PART ID | PART NAME | POSITION | | CENTRAL POSITION | | INTERVAL BETWEEN CENTERS |
|---|---|---|---|---|---|---|
| | | POSITION IN WIDTH DIRECTION | POSITION IN WIDTH DIRECTION | POSITION IN WIDTH DIRECTION | POSITION IN WIDTH DIRECTION | |
| P001 | EYEBROW | OOOO | OOOO | OOOO | OOOO | OO |
| P002 | EYE | OOOO | OOOO | OOOO | OOOO | OO |
| P003 | NOSE | OOOO | OOOO | OOOO | OOOO | — |
| P004 | MOUTH | OOOO | OOOO | OOOO | OOOO | — |
| P005 | PROFILE | OOOO | OOOO | OOOO | OOOO | — |
| P006 | FRONT HAIR | OOOO | OOOO | OOOO | OOOO | — |
| P007 | REAR HAIR | OOOO | OOOO | OOOO | OOOO | — |
| P008 | EAR | OOOO | OOOO | OOOO | OOOO | OO |
| ⋮ | ⋮ | ⋮ | ⋮ | ⋮ | ⋮ | ⋮ |

FIG.3A

PART WEIGHTING MANAGEMENT TABLE 53

| PRIORITY ORDER | PART NAME | ELEMENTS TO BE PRIORITIZED | OTHERS |
|---|---|---|---|
| 001 | EYE | INTERVAL | |
| 002 | EYE | ROTATION ANGLE | |
| 003 | EYEBROW | INTERVAL | |
| 004 | EYEBROW | ROTATION ANGLE | |
| 005 | EYE | SIZE | |
| 006 | EYEBROW | SIZE | |
| 007 | EYE | POSITION | |
| 008 | EYEBROW | POSITION | |
| 009 | MOUTH | POSITION | |
| 010 | MOUTH | SIZE | |
| 011 | NOSE | POSITION | |
| 012 | NOSE | SIZE | |
| ⋮ | ⋮ | ⋮ | ⋮ |

FIG.3B

BASIC PORTRAIT ILLUSTRATION MANAGEMENT TABLE 54

| BASIC PORTRAIT ILLUSTRATION ID | CREATION YEAR/MONTH/DAY | APPROXIMATION DEGREE AT THE TIME OF CREATION | OTHERS |
|---|---|---|---|
| BI001 | ○○/○○/○○ | – | |
| BI002 | ○○/○○/○○ | – | |
| BI003 | ○○/○○/○○ | – | |
| ⋮ | ⋮ | ⋮ | ⋮ |
| BI0○○ | ○○/○○/○○ | ○○ | |
| BI0○○ | ○○/○○/○○ | ○○ | |
| ⋮ | ⋮ | ⋮ | ⋮ |

FACE RECOGNITION/MATCHING PROCESSING

PREDETERMINED APPROXIMATION DEGREE. UPDATING PROCESSING

FACE RECOGNITION/MATCHING PROCESSING

FIG.15
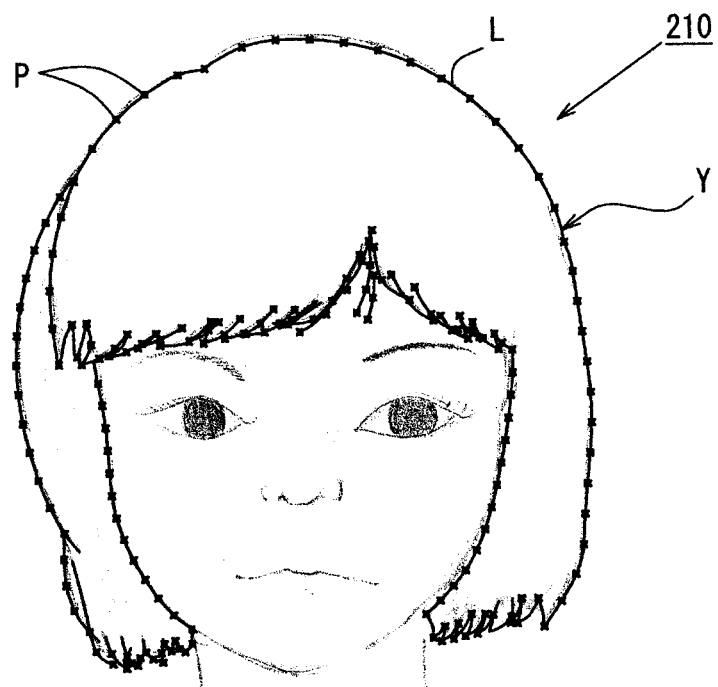
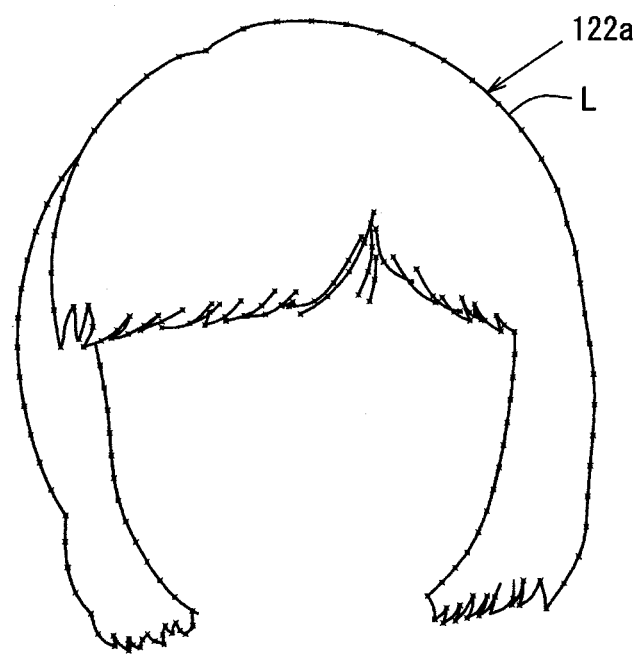

PORTRAIT ILLUSTRATION CREATION SYSTEM, CHARACTER CREATION SYSTEM, AND CREATED PORTRAIT ILLUSTRATION DISPLAY SYSTEM

TECHNICAL FIELD

The present invention relates to a portrait illustration creation system for creating portrait illustration data based on face photo data of a face of which a portrait illustration is desired to be created.

BACKGROUND ART

Conventionally, a great number of devices for creating a portrait illustration based on a photo of a face have been proposed. For example, Patent Document 1 identified below proposes a device operating as follows. A matching degree between facial parts of a photo of a face of which a portrait illustration is desired to be created and a plurality of facial parts registered in a database is determined based on feature amounts of the facial parts of the photo. When the database includes facial parts having a matching degree of a certain level or higher, a portrait illustration is created using such registered facial parts.

CITATION LIST

Patent Literature

Patent Document 1: Japanese Laid-Open Patent Publication No. 11-85953

SUMMARY OF INVENTION

Technical Problem

When a person determines whether or not a portrait is similar to the model of the portrait, the person observes the entire portrait while moderately deforming features of the model. Therefore, even if, for example, individual parts of the portrait such as the eyes, mouth, etc. are very similar to those of the model, how similar the observer feels the portrait is to the model depends on, for example, the positions, sizes and the like of the individual parts with respect to the entire face and the balance thereof.

Accordingly, by a method of, as proposed in Patent Document 1, using individual facial parts having a matching degree of a certain level or higher, it is difficult to create a portrait illustration which has the features moderately deformed and is determined to be similar to the face of the model when observed entirely.

The present invention has an object of providing a portrait illustration creation system for creating portrait illustration data based on face photo data of a face of which a portrait illustration is desired to be created, in which a portrait illustration determined to be more similar is created with a simple system configuration.

Solution to Problem

The present invention is directed to a portrait illustration creation system comprising basic face photo data storage means for storing a plurality of pieces of face photo data of basic faces, based on which a portrait illustration is to be created, as basic face photo data; basic portrait illustration data storage means for storing a plurality of basic portrait illustrations, which are illustrations of the basic faces, as basic portrait illustration data formed of a combination of a plurality of parts; associating information storage means for storing information which associates the basic face photo data with the basic portrait illustration data; approximate basic face photo extraction means for recognizing, from face-photo-data-to-be-illustrated which is a photo of a face-to-be-illustrated of which a portrait illustration is desired to be created, the face-to-be-illustrated; performing matching between the face-to-be-illustrated and the basic faces represented by the plurality of pieces of basic face photo data stored on the basic face photo data storage means; and extracting the basic face photo data having a high approximation degree; part difference extraction means for extracting a difference on each of the parts between the basic face of the basic face photo data extracted by the approximate basic face photo extraction means and the face-to-be-illustrated represented by the face-photo-data-to-be-illustrated; part adjustment means for making an adjustment on the part having a difference of a difference amount exceeding a predetermined amount, the difference being extracted by the part difference extraction means, wherein the adjustment is made on the part of the basic portrait illustration data associated with the basic face photo data extracted by the approximate basic face photo extraction means so that the difference amount of the difference becomes equal to or less than the predetermined amount; and portrait illustration data output means for outputting basic portrait illustration data, adjusted by the part adjustment means, as portrait illustration data.

The parts may be the eyes, eyebrows, nose, ears, mouth, profile of the face area, hair, beard/mustache, mole, glasses or the like.

The basic portrait illustration data may be obtained as follows. A basic portrait illustration, which is an illustration of a basic face, is divided into a plurality of parts, and the parts are combined to create the basic portrait illustration data reproducing the basic portrait illustration. Alternatively, parts, each of which is an illustration of a part of a basic face, are created in advance, and the parts are combined to create the basic portrait illustration data. For one piece of basic face photo data, one or more pieces of basic portrait illustration data may be provided.

The associating information storage means may be storage means provided separately from the basic face photo data storage means or the basic portrait illustration data storage means, or may be storage means provided together with either of the basic face photo data storage means or the basic portrait illustration data storage means.

The differences encompass differences regarding the positions, sizes, intervals, angles of location, or the like of the parts.

The portrait illustration output means encompasses means for displaying portrait illustration data on a display, means for storing portrait illustration data as electronic data on a storage medium and outputting the portrait illustration data, and output means for printing portrait illustration data. In this specification, portrait illustration data or basic portrait illustration data which is output or displayed is referred to as a "portrait illustration".

Owing to the above, a portrait illustration having a high degree at which the user or a person looking at the portrait illustration feels that the portrait illustration is similar, namely, having a high degree of similarity, can be created with a simple system configuration.

In more detail, the portrait illustration creation system operates as follows. Basic face photos on basic faces and basic portrait illustrations, each of which is an illustration of each basic face, are stored on the storage means. In more detail, for one piece of basic face photo data, one or more pieces of basic portrait illustration data are stored on the storage means. Matching is performed between the face-photo-data-to-be-illustrated of which a portrait illustration is desired to be created and the basic face photo data. Using the basic portrait illustration data corresponding to the basic face photo data having a high approximation degree, portrait illustration data corresponding to the face-photo-data-to-be-illustrated is created and output. Therefore, a portrait illustration having a higher degree of similarity can be created easily.

In more detail, the basic portrait illustration, which is an illustration of a basic face, is created and stored as a result of, for example, mild deformation of the basic face. Therefore, features of the basic face such as "having big eyes" or "having drooping eyes" are reflected on the basic portrait illustration. Thus, the basic portrait illustration has a high degree of similarity. The portrait illustration data is created using the basic portrait illustration data corresponding to the basic face represented by the basic face photo which has a high approximation degree with the face-to-be-illustrated represented by the face-photo-data-to-be-illustrated of which a portrait illustration is desired to be created. Therefore, a portrait illustration which indirectly reflects the features of the face-to-be-illustrated and has a high degree of similarity can be created easily.

Accordingly, as compared with the case where, for example, the shape of the entire face-to-be-illustrated is recognized and portrait illustration data is created based on the recognized shape, portrait illustration data having a higher degree of similarity can be created with a smaller load on the system. In more detail, in the case where portrait illustration data is created based on the recognized shape of the face-to-be-illustrated, a portrait illustration can be created realistically. However, the features of the face-to-be-illustrated are not reflected. Therefore, the degree at which the user or a person looking at the portrait illustration data feels that the portrait illustration data is similar is low. In the case where portrait illustration data is created based on the recognized shape of the entire face-to-be-illustrated, the load on the system caused by the shape recognition and creation of the illustration data performed based on the recognized shape is large.

For example, in the case where a matching degree between facial parts of a face-to-be-illustrated and a plurality of types of facial parts registered in a database is determined based on feature amounts of the facial parts of face-to-be-illustrated and portrait illustration data is created using the registered parts having a matching degree of a certain level or higher, it is difficult to reflect the entire balance or features of the face-to-be-illustrated. The degree at which the user or a person looking at the portrait illustration data feels that the portrait illustration data is similar is low.

By contrast, with the portrait illustration creation system according to the present invention, the basic face photo data on each of basic faces and the basic portrait illustration data, which is an illustration of each of the basic faces, are stored as a pair on the storage device; matching is performed between the face-photo-data-to-be-illustrated of which a portrait illustration is desired to be created, and the basic face photo data; and using the basic portrait illustration data of the basic face photo having a high approximation degree, portrait illustration data of the face-photo-data-to-be-illustrated is created and output. Therefore, portrait illustration data having a higher degree of similarity can be created easily with a smaller load on the system.

Matching is performed between the face-to-be-illustrated represented by the face-photo-data-to-be-illustrated of which a portrait illustration is desired to be created, and the basic faces represented by the basic face photo data. Namely, matching is performed between the face photos, i.e., between the same type of materials. Therefore, as compared with the case where, for example, direct matching is performed between the face-photo-data-to-be-illustrated and the basic portrait illustration data, which is an illustration of each of the basic faces or an illustration of parts, the matching can be performed with higher precision.

The basic portrait illustration data as an illustration of a basic face is formed of a combination of a plurality of parts. Therefore, as compared with the case where, for example, a matching degree between facial parts of a face-to-be-illustrated and a plurality of types of facial parts registered in a database is determined based on feature amounts of the facial parts of the face-to-be-illustrated and then portrait illustration data is created using the registered parts having a matching degree of a certain level or higher, a portrait illustration which is more balanced entirely can be created and also the load on the system caused by the creation of the portrait illustration can be decreased.

The parts can be adjusted while the entire balance of the basic portrait illustration, which reflects the features, is kept. Therefore, a portrait illustration data having a high degree of similarity can be created.

The differences which do not much influence the degree of similarity of the portrait illustration are not adjusted, and only the parts having differences of a predetermined amount or greater, namely, only the parts having a large difference amount are adjusted. Owing to this, a portrait illustration having a higher degree of similarity can be created while the increase of the load on the system caused by the creation of the illustration is suppressed.

As described above, the basic portrait illustration data, which is an illustration of a basic face, is formed of a combination of a plurality of parts and only the parts having a large difference amount are adjusted. Owing to this, portrait illustration data which keeps the entire balance and has a higher degree of similarity can be created.

In more detail, in the case where the basic portrait illustration data is used as the portrait illustration data, namely, the basic portrait illustration data is the final product, the portrait illustration data indirectly reflects the features of the basic face reflected on the basic portrait illustration data.

By contrast, with the portrait illustration creation system according to the present invention, the basic portrait illustration data, which is an illustration of a basic face, is formed of a combination of the parts. Matching is performed between the face-photo-data-to-be-illustrated of which a portrait illustration is desired to be created and the basic face photo data. Each part of the basic portrait illustration data corresponding to the basic face photo having a high degree of approximation is adjusted. Therefore, the portrait illustration data can directly reflect the features of the face-to-be-illustrated and can have an improved degree of similarity. Namely, with the portrait illustration creation system according to the present invention, the basic portrait illustration data is merely means for creating portrait illustration data. The portrait illustration data which directly reflects the features of the face-to-be-illustrated is created as a result of adjusting the basic portrait illustration data, which is the means for creating the portrait illustration data, and is provided as the final product. Thus, a portrait illustration having a higher degree of similarity can be created.

In an embodiment of the present invention, the parts may include at least an eye part and an eyebrow part. The eye part and the eyebrow part may each include a right part and a left part and also include information on left-right intervals between the right part and the left part and information on rotation centers around which the right part and the left part are respectively rotated. The part adjustment means may be capable of adjusting, regarding each of the eye part and the eyebrow part, a size and a position with respect to a head area in the basic portrait illustration data, and also the left-right interval and a rotation angle around the rotation center.

In a portrait illustration, the degree of similarity is significantly changed by adjusting the eyes and eyebrows, which are features having a large influence on the degree of similarity. According to the present invention, the eye part and the eyebrow part each include a right part and a left part, and the left-right intervals between the right parts and the left parts and the rotation angles of the right parts and the left parts around the respective rotation centers are adjusted. Owing to this, the degree of similarity of the created portrait illustration can be drastically improved.

In an embodiment of the present invention, the parts may include at least a face profile part, a hair style part, a mouth part, a nose part, an eye part and an eyebrow part. The eye part and the eyebrow part may each include a right part and a left part and also include information on left-right intervals between the right parts and the left parts and information on rotation centers around which the right part and the left part are respectively rotated. The part adjustment means may be capable of adjusting, regarding each of the hair style part, the mouth part and the nose part, a size and a position with respect to the face profile part. The part adjustment means may also be capable of adjusting, regarding each of the eye part and the eyebrow part, a size and a position with respect to the face profile part, and also the left-right interval and a rotation angle around the rotation center.

In a portrait illustration, the degree of similarity is significantly changed by adjusting the eyes and eyebrows, which are features having a large influence on the degree of similarity. According to the present invention, the eye part and the eyebrow part each include a right part and a left part. The sizes and the positions of these eye parts and the eyebrow parts with respect to the face profile part are adjusted, and also the left-right intervals between the right parts and the left parts and the rotation angles thereof around the respective rotation centers are adjusted. Regarding the mouth part and the nose part which do not much influence on the degree of similarity, only the sizes and the positions thereof with respect to the face profile part are adjusted. Owing to this, the degree of similarity of the created portrait illustration can be drastically improved while the increase of the load on the system caused by the adjustment of the parts is suppressed.

In an embodiment of the present invention, the portrait illustration creation system further comprises hair shape recognition means for recognizing a shape of a hair area, which is an area of hair in the face-to-be-illustrated recognized from the face-photo-data-to-be-illustrated; and shape-recognized hair style part creation means for creating a shape-recognized hair style part based on the shape of the hair recognized by the hair shape recognition means. The portrait illustration data is created using the shape-recognized hair style part instead of the hair style part.

Owing to this, portrait illustration data having a higher degree of similarity can be created with a simple system. In more detail, the hair style can be easily changed or the hair can be made longer or shorter even for the same person. Therefore, in order to create portrait illustration data having a high degree of similarity with high precision, basic portrait illustration data corresponding to a basic face of a plurality of hair styles needs to be registered. This increases the scale of the storage means.

By contrast, according to the present invention, a shape-recognized hair part based on the shape of the hair, which can be changed easily, is created by the shape-recognition hair style part creation means. Therefore, as compared with the case where the shape of the entire head is recognized to create portrait illustration data, the increase of the load on the system can be decreased. In addition, as compared with the case where the basic portrait illustration data corresponding to basic face data of a plurality of hair styles is stored on the storage means, the number of patterns to be stored can be decreased. Therefore, portrait illustration data having high precision and a high degree of similarity can be created with small scale storage means.

In an embodiment of the present invention, the portrait illustration creation system may further comprise face area extraction means for extracting a face area, which is an area of the head area excluding the hair area, from the face-to-be-illustrated recognized from the face-photo-data-to-be-illustrated and each of the basic faces of the basic face photo data. The approximate basic face photo extraction means may perform matching between the face area of the face-to-be-illustrated and the face area of each of the basic faces, and extracts the basic face photo data having a high approximation degree.

Owing to this, portrait illustration data having a higher degree of similarity can be created with a simple system. In more detail, the hair style can be easily changed or the hair can be made longer or shorter even for the same person. Therefore, the data may not match occasionally even between the photos of the same person when the hair style is changed. However, with the portrait illustration creation system according to the present invention, matching is performed between the face area in the face-to-be-illustrated extracted by the face area extraction means and the face area of each of the basic faces, and the basic face photo data having a high approximation degree is extracted. Therefore, a portrait illustration can be created based on the portrait illustration data which reflects the features of the face area and has a high degree of similarity, without relying on the hair style.

In an embodiment of the present invention, the portrait illustration creation system may further comprise weighting means for performing weighting on the parts based on an influence exerted on a portrait illustration. When there are a plurality of parts having a difference of a difference amount exceeding the predetermined amount, the difference amount of the difference being calculated by the part difference extraction means, the part adjustment means may adjust each of the parts in accordance with a weight provided by the weighting means.

The weighting encompasses weighting performed on each item to be adjusted of each part, and weighting performed on the entirety of each part.

Owing to this, for example, the parts which significantly influence the portrait illustration may be weighted more and adjusted with priority. Thus, a portrait illustration can be created to have an improved degree of similarity while the increase of the load on the system caused by the adjustment is further suppressed.

In an embodiment of the present invention, the portrait illustration creation system may further comprise approximation degree calculation means for calculating an approximation degree between the basic face photo data extracted by the approximate basic face photo extraction means and the face-photo-data-to-be-illustrated; approximation degree determination means for determining whether or not the approximation degree calculated by the approximation degree calculation means exceeds a predetermined approximation degree; approximation-degree-with-achievements storage means for storing the approximation degree in association with the face-photo-data-to-be-illustrated to be stored on the basic face photo data storage means as new basic face photo data and also in association with the portrait illustration data to be stored on the basic portrait illustration data storage means as new basic portrait illustration data; and predetermined approximation degree updating means for updating the predetermined approximation degree in accordance with the approximation degrees of a predetermined number or greater, which are stored on the approximation-degree-with-achievements storage means.

Owing to this, the face-photo-data-to-be-illustrated, based on which a portrait illustration has been created, and the portrait illustration data, can be stored as the basic face photo data and the basic portrait illustration data of a new basic face. Therefore, the number of patterns of the basic faces is increased. Thus, the precision of the matching can be improved, and a portrait illustration having a higher degree of similarity can be created.

The number of the registered patterns of the basic faces is increased, and thus the predetermined approximation degree, based on which the determination on the approximation degree is made by approximation degree determination means, is improved based on the achievements provided by the approximation degree. Owing to this, a portrait illustration having a higher degree of similarity can be created.

In an embodiment of the present invention, the portrait illustration creation system may further comprise face-photo-data-to-be-illustrated receiving means for receiving, via an electric communication line, the face-photo-data-to-be-illustrated from a user terminal of a user wishing to have a portrait illustration created. The portrait illustration data output means may include portrait illustration data transmission means for transmitting the portrait illustration data to the user terminal.

The user terminal encompasses a user terminal such as a camera-equipped mobile phone, a camera-equipped PDA or the like which can be carried around by the user, or a user terminal such as a personal computer or the like connectable with imaging means such as a digital camera or the like.

The electric communication line encompasses the Internet, a telephone line, a personal computer communication line or any other communication line.

Owing to this, the user can transmit the face-photo-data-to-be-illustrated of which a portrait illustration is desired to be created via the electric communication line and receive the created portrait illustration data by the user terminal. Therefore, the convenience is improved.

The present invention is also directed to a character creation system comprising character creation means for creating character information which represents a character of a user for whom a portrait illustration has been created, based on the portrait illustration data created by the above-described portrait illustration creation system.

The character encompasses, for example, a character acting as the other self of the user used in a web community, and a character virtually moving on a wallpaper of a personal computer or a standby screen of a mobile phone.

Owing to this, the user can have a character of a portrait illustration similar to himself/herself created and, for example, use the character in a web community. Therefore, the satisfaction degree of the user can be improved.

The present invention is further directed to a created portrait illustration display system comprising illustration display means for allowing the portrait illustration data created by the above-described portrait illustration creation system to be displayed on a desired object.

The illustration display means encompasses a printing device for printing the portrait illustration data on an object specifying the user, such as a medicine bag of a medicine provided in accordance with the prescription, a company employee ID or the like.

Owing to this, the display can be made on an object capable of specifying the user with certainly.

Advantageous Effects of Invention

The present invention can provide a portrait illustration creation system for creating portrait illustration data based on face photo data of a face of which a portrait illustration is desired to be created, in which a portrait illustration determined to be more similar is created with a simple system structure.

BRIEF DESCRIPTION OF DRAWINGS

FIGS. 2A and 2B show an information management table stored in a management DB.

FIGS. 3A and 3B show an information management table stored in a management DB.

FIG. 15 shows the hair shape recognition processing.

DESCRIPTION OF EMBODIMENTS

An embodiment of the present invention will be described with reference to the drawings.

A portrait illustration creation system 1 creates portrait illustration data 220 (see FIG. 10) based on face-photo-data-to-be-illustrated 210 (see FIG. 9) sent from a user and representing a face of which a portrait illustration is desired to be created. A system configuration of the portrait illustration creation system 1 will be described with reference to FIG. 1 through FIG. 6. FIG. 1 through FIG. 6 show the system configuration of the portrait illustration creation system 1.

Figure 1:
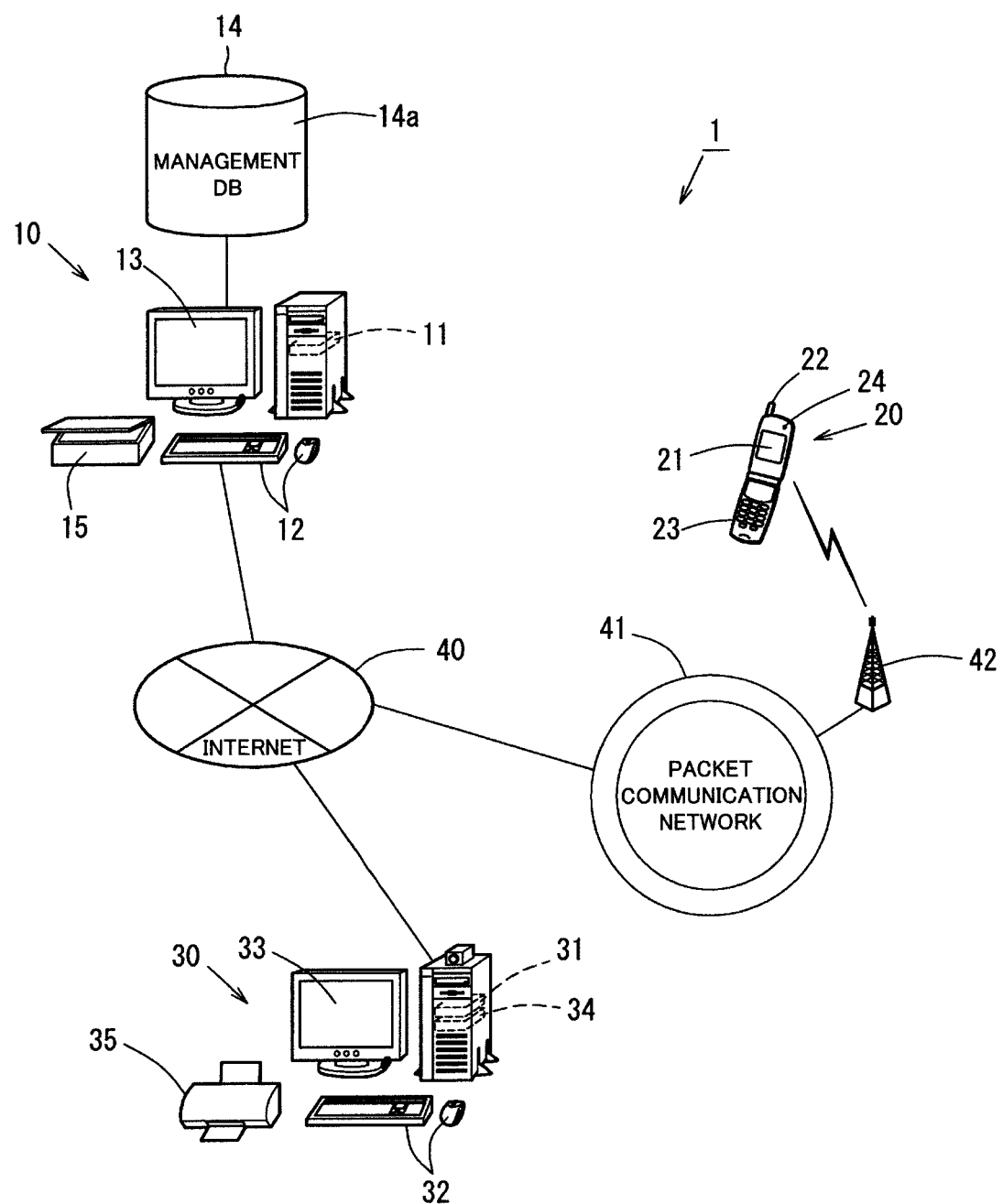
FIG. 1 shows a system configuration of a portrait illustration creation system.
Figure 4:
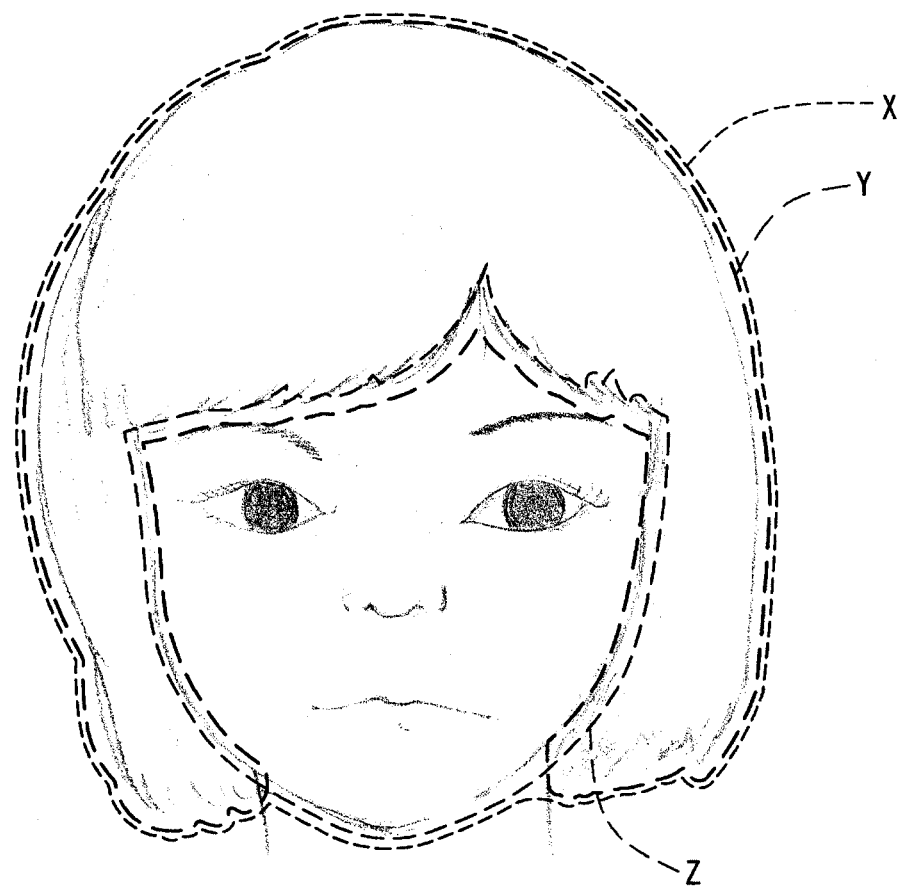
FIG. 4 shows a head area, a hair area and a face area.
Figure 5:
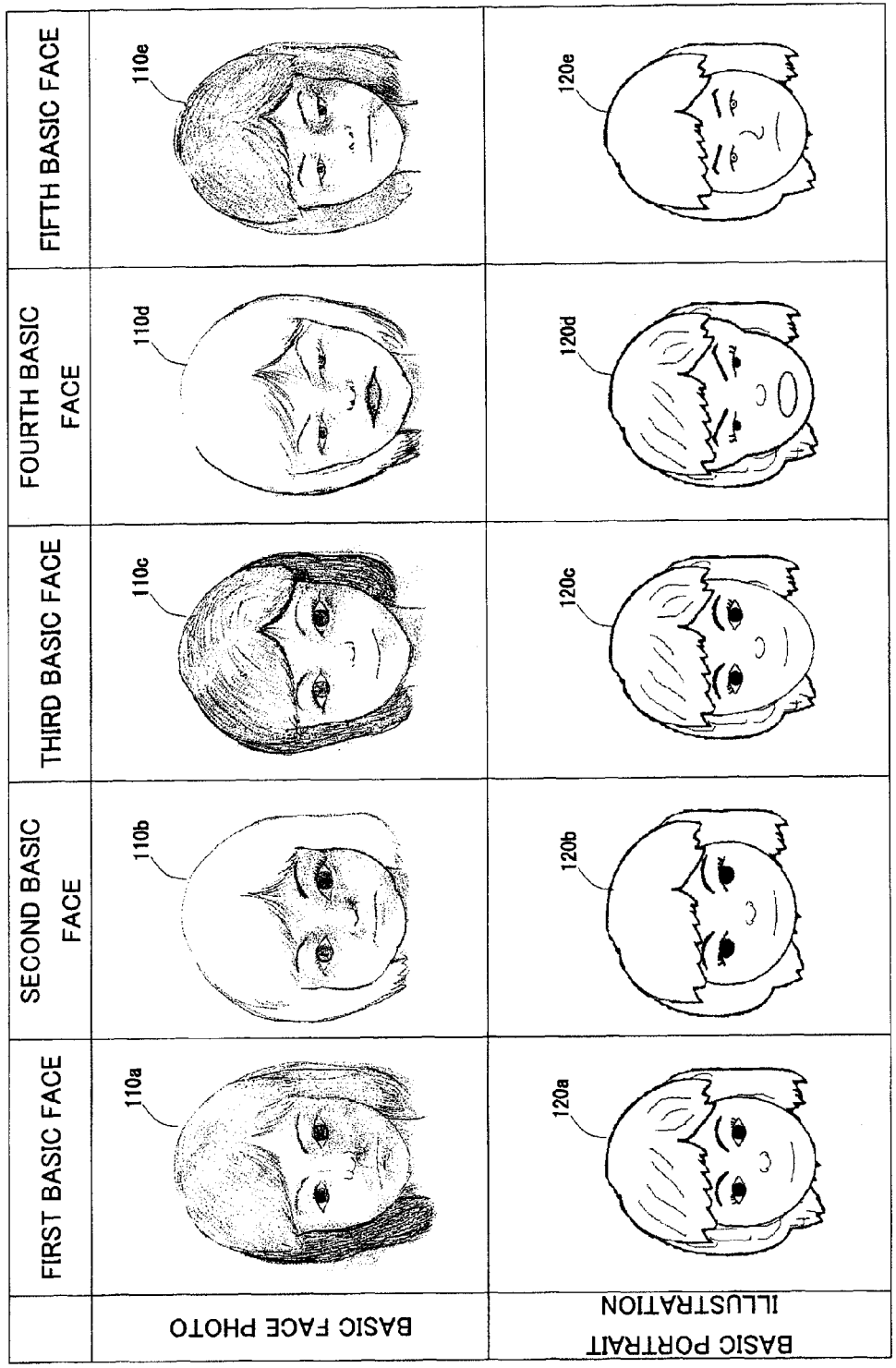
FIG. 5 shows basic face data stored in the management DB.
Figure 6:
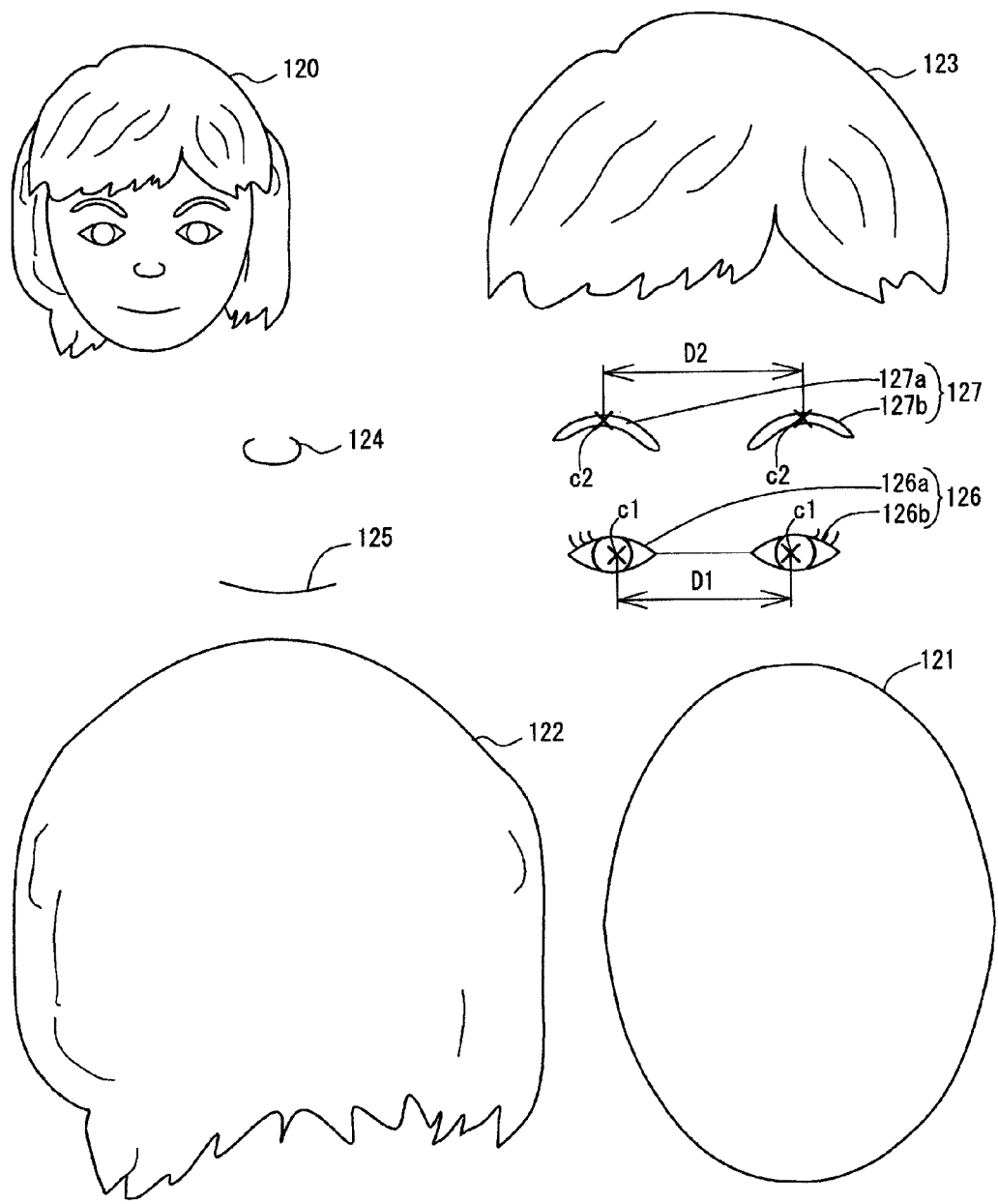
FIG. 6 is an exploded view showing basic portrait illustration data.

FIG. 1 shows the system configuration of the portrait illustration creation system 1. FIGS. 2A, 2B, 3A, and 3B show information management tables stored in a management DB 14a. FIG. 4 shows a head area X, a hair area Y, and a face area Z. FIG. 5 shows basic face data stored in the management DB 14a. FIG. 6 is an exploded view of basic portrait illustration data 120.

The portrait illustration creation system 1 includes a management server 10 and a user mobile phone 20 or a user terminal 30 used by the user. FIG. 1 shows one user mobile phone 20 and one user terminal 30, but this is for simplifying the explanation of the portrait illustration creation system 1. In actuality, a plurality of user mobile phones 20 and a plurality of user terminals 30 are included. In more detail, the user mobile phones 20 and the user terminals 30 are included by the number of the users using the portrait illustration creation system 1.

The management server 10 and the user mobile phone 20 or the user terminal 30 are connected to each other by the Internet 40. In more detail, the user mobile phone 20 is connected to the Internet 40 via a packet communication network 41 and a transmission antenna 42 connected to the packet communication network 41.

The management server 10 is a computer, and includes a control device 11 including a CPU, a ROM and a RAM; an operation device 12, which is an input device such as a mouse, a keyboard or the like; a display 13 including a CRT, a liquid crystal screen or the like; a storage device 14 such as a hard disc or the like; a scanner device 15 for reading an output photo or portrait illustration; a storage medium read device for reading information from various types of storage mediums such as a DVD-RAM and the like, or a storage medium read/write device; and a transmission/receiving device including a communication device for performing communication via the Internet 40 such as a LAN board or the like.

The management server 10 has a WEB server function, a database server function, and a mail server function.

The management server 10 stores and manages, by means of the management database (DB) 14a stored on the storage device 14, information regarding a basic face based on which a portrait illustration is created, information regarding basic portrait illustration data, which is an illustration of the basic face, information regarding part data included in the basic portrait illustration data, information regarding weighting data on parts, and information necessary for operating the portrait illustration creation system 1.

As shown in FIG. 2A, which shows a basic face management table 51, the information regarding the basic face data includes a unique basic face ID, which is set for each of registered basic faces; a basic face photo ID, which is an ID of a face photo of the basic face; a head area feature pattern ID, which is an ID of a feature pattern extracted from a head area X of the face photo; a face area feature pattern ID, which is an ID of a feature pattern extracted from a face area Z of the face photo; a basic portrait illustration ID, which is an ID of basic portrait illustration data representing an illustration of the basic face; and other information.

In this specification, as shown in FIG. 4, the "head area X" means the entirety of a front area of the head above the neck, the "hair area Y" means a hair area, and the "face area Z" means an area of the head area X excluding the hair area Y. Therefore, when the hair area Y is not present as in the case of, for example, a skin head, the head area X matches the face area Z.

As shown in, for example, FIG. 2B, which shows a first basic facial part management table 52, the information regarding the parts data included in the basic portrait illustration data includes position information, central position information and interval information, and other information of the parts included in the basic portrait illustration data of each basic face. The "interval information" is stored in parts including two parts, i.e., a left part and a right part, for example, eyes.

As shown in FIG. 3A, which shows a part weighting management table 53, the information regarding the weighting data on the parts has weighting information including information on elements which are to be prioritized in position adjustment of the parts of each of the basic portrait illustration data, and other information.

The weighting information stored in the part weighting management table 53 is set when the part weighting management table 53 is stored on the storage device 14. Alternatively, for example, the weighting on the parts may be set after the influence exerted by the position adjustment of each part is determined based on the responses to the questionnaire provided by the users of the portrait illustration data 220, which is created after the apposition adjustment of the parts.

As shown in FIG. 3B, which shows a basic portrait illustration management table 54, the information regarding the basic portrait illustration data includes a basic portrait illustration ID, which is an ID of the basic portrait illustration data of each basic face; creation year/month/day information representing the date on which the basic portrait illustration data was created, approximation degree information calculated at the time of the creation, and other information.

The storage device 14 further stores a control program, a transmission/receiving program, a display program and a read/write program for controlling and operating the operation device 12, the display 13, the scanner device 15 and the transmission/receiving device, as well as a matching program, a determination program, a part position adjustment program, a predetermined approximation degree updating program, an information receiving and registration program and the like.

The transmission/receiving program is for executing information transmission/receiving with the user mobile phone 20 or the user terminal 30, and is for receiving a display request and data updating information from the user mobile phone 20 or the user terminal 30.

The display program is for executing and controlling the display of each of various types of information on the display 13. The read/write program is for writing various types of information on a storage medium such as the storage device 14, the storage medium read device or the like, and when necessary, reading the written information from the storage medium.

The matching program includes a head area extraction module, a head area cutout module, a head area normalization module, a feature pattern extraction module, a feature pattern matching module, an approximation degree calculation module, and other modules necessary for matching processing.

The head area extraction module is for extracting the head area X from the face-photo-data-to-be-illustrated. The head area X is extracted by a conventional area extraction method, which will not be described.

The head area cutout module is for cutting out the head area X extracted by the head area extraction module. The extracted head area X is cut out by a conventional area cutout method, which will not be described.

The head area normalization module is for normalizing the head area X cut out by the head area cutout module so that the next processing, for example, feature pattern extraction executed by the feature pattern extraction module described below, can be executed. The cut-out head area X is normalized by a conventional area normalization method, which will not be described.

The feature pattern extraction module is for extracting the feature pattern from the head area X normalized by the head area normalization module. The feature pattern is extracted from the head area X normalized by the head area normalization module by a conventional feature pattern extraction method, which will not be described. For example, a Gabor wavelet transformation method or a graph matching method may be used.

The feature pattern matching module is for comparing and performing matching between the feature pattern of the head area X in the face-photo-data-to-be-illustrated extracted by the feature pattern extraction module and the feature pattern of the head area X in each of the basic face photos registered in the management DB 14a, and for calculating a difference therebetween found as a result of the matching and a difference amount of the difference. The comparison and matching with the feature pattern of the basic face is executed by a conventional feature pattern matching method, which will not be described. An appropriate method, for example, a mutual subspace method, a neural network method or the like may be used.

The approximation degree calculation module is for calculating the approximation degree obtained as a result of the matching executed by the feature pattern matching module between the feature pattern of the face-photo-data-to-be-illustrated and the feature pattern of each of the basic faces.

As described above, the matching program includes the head area extraction module, the head area cutout module, the head area normalization module, the feature pattern extraction module, the feature pattern matching module, the approximation degree calculation module, and other modules necessary for the matching processing. Alternatively, each of the modules may be formed of an individual program.

The determination program is for comparing, for example, the calculation result and a predetermined value provided as a reference and making a determination.

The part position adjustment program is for adjusting the positions, sizes, intervals, rotation angles and the like of the parts in the basic portrait illustration data.

The predetermined approximation degree updating program is for updating the predetermined approximation degree, which is a reference for determining the approximation degree by the determination program.

The information receiving and registration program is for receiving various types of information such as the basic face information and the like and registering the received information in the management DB 14a.

The above-described various programs are executed by a cooperation of the CPU, the ROM and the RAM included in the control device.

The storage device 14 also stores basic face photo data corresponding to the basic face photo ID, feature pattern data corresponding to the feature pattern ID, basic portrait illustration data corresponding to the basic portrait illustration ID, and data on the parts included in the basic portrait illustration data. In this example, as shown in FIG. 5, for the basic faces of five patterns, basic face photo data 110 (110a, 110b, 110c, 110d, 110e) and basic portrait illustration data 120 (120a, 120b, 120c, 120d, 120e) are stored as pairs. This will be described later in detail.

FIG. 6 is an exploded view of the basic portrait illustration data 120. As shown in FIG. 6, each of the basic portrait illustration data 120 of each of the basic faces of the five patterns stored on the storage device 14 as described above includes a face profile part 121, a rear hair part 122, a front hair part 123, a nose part 124, a mouth part 125, an eye part 126, and an eyebrow part 127.

The eye part 126 includes a right eye part 126a and a left eye part 126b. Rotation center c1 around which each eye part is rotated for adjustment is set, and also standard interval D1 is set. The eyebrow part 127 includes a right eyebrow part 127a and a left eyebrow part 127b. Rotation center c2 around which each eyebrow part is rotated for adjustment is set, and also standard interval D2 is set.

The standard interval D and the rotation center c of each of the eye part 126 and the eyebrow part 127 are set and stored when the basic portrait illustration data 120 is stored on the storage device 14. For example, a rotation center setting program may be provided for automatically rotating the eye part 126 and the eyebrow part 127 and setting the position at which the influence of the rotation is exerted most on the portrait illustration as the rotation center c.

Now, the user mobile phone 20 used by the user who wishes to have a portrait illustration created will be described. The user mobile phone 20 is communicable with the transmission antenna 42 wirelessly, and includes a control device including a CPU, a ROM and a RAM, a storage device including a nonvolatile memory or the like, a display 21, an input device 23 including a push button or the like, a voice input device such as a microphone or the like, a voice output device such as a speaker or the like, a communication device (communication section) 22 such as an antenna or the like, a camera 24 and the like.

In this example, the user mobile phone 20 is a usual mobile phone, but may be, for example, a mobile phone capable of high speed communication such as a next generation mobile phone or the like, or even a mobile terminal exclusive for packet communication.

Instead of the user mobile phone 20, a wireless LAN, an SS wireless system using the 2.4 G band, a PHS line communicable with a general telephone line via a PHS antenna, or the like may be used for communication, for example.

On the storage device of the user mobile phone 20, the following is stored in addition to information and programs necessary when the user mobile phone 20 is used for the original use as a telephone: a camera control program for controlling the camera 24 included in the user mobile phone 20, a browser program, a mail program, an information transmission program, other programs for executing necessary processing, and the like.

The user terminal 30 is a computer, and includes a control device 31 including a CPU, a ROM and a RAM; an operation device 32, which is an input device such as a mouse, a keyboard or the like; a display 33 including a CRT, a liquid crystal screen or the like; a storage device 34 such as a hard disc or the like; a printer device 35 for printing a created portrait illustration and the like; a storage medium read device for reading information from various types of storage mediums such as a DVD-RAM and the like, or a storage medium read/write device; and a transmission/receiving device including a communication device for performing communication via the Internet 40 such as a LAN board or the like.

The user terminal 30 has a WEB server function, a database server function, and a mail server function.

The storage device 34 stores a control program, a transmission/receiving program, a display program and a read/write program for controlling and operating the operation device 32, the display 33, the printer device 35 and the transmission/receiving device.

The above-described various programs are executed by a cooperation of the CPU, the ROM and the RAM included in the control device.

By the above-described system configuration, the management server 10 can receive the face-photo-data-to-be-illustrated 210 of which a portrait illustration is desired to be created from the user mobile phone 20 or the user terminal 30 which has accessed the management server 10 via the Internet 40, create the portrait illustration data 220 based on the basic portrait illustration data 120 of the basic face registered in the management DB 14a, transmit the created portrait illustration data 220 to the user mobile phone 20 or the user terminal 30 of the subscriber, and display the created portrait illustration data 220 on the display 21 or 33 of the user mobile phone 20 or the user terminal 30.

With reference to FIG. 7 through FIG. 12, portrait illustration creation processing of creating the portrait illustration data 220 based on the face-photo-data-to-be-illustrated 210 in response to a request to create a portrait illustration from the user as described above will be described in detail.

Figure 7:
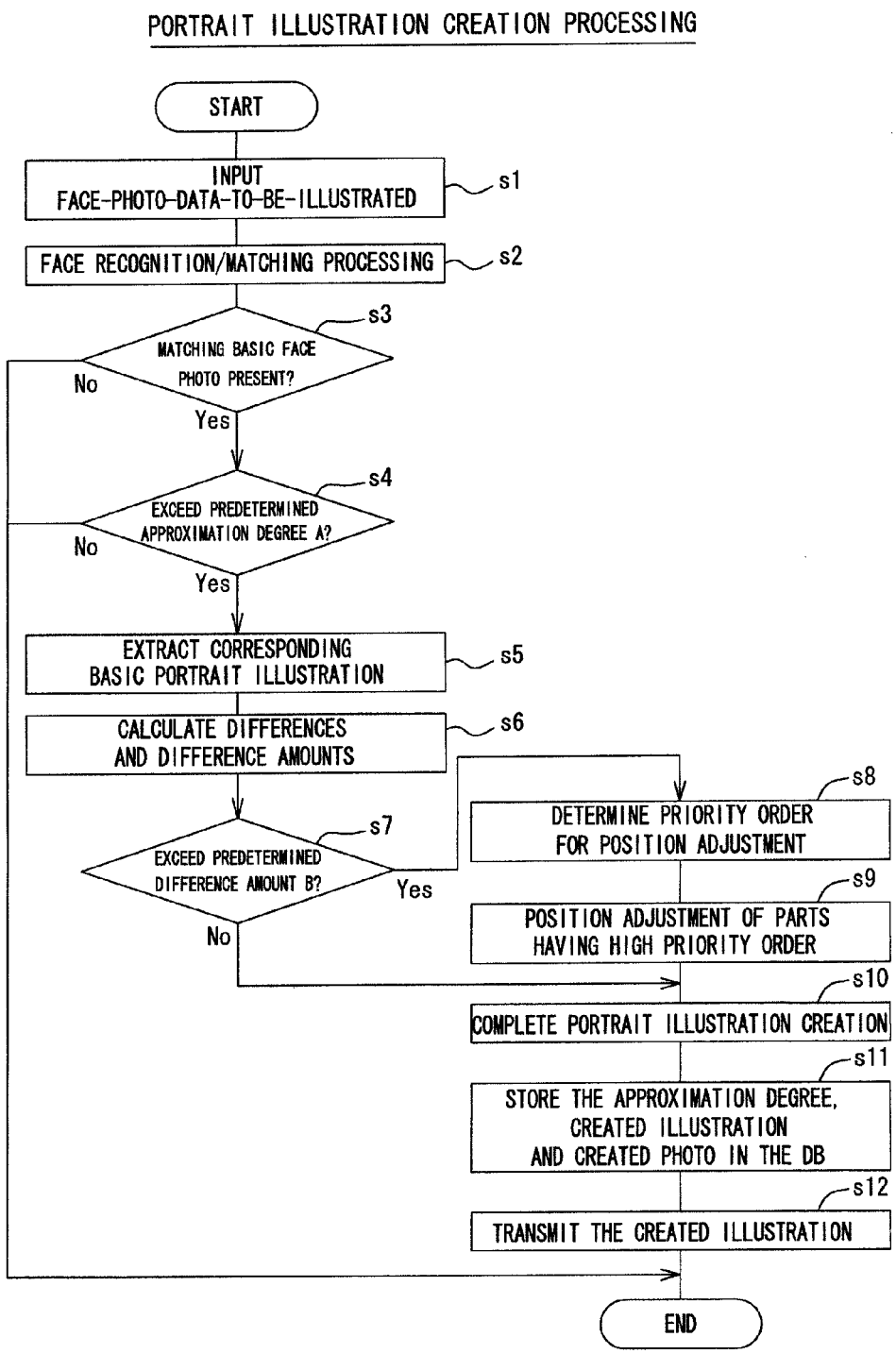
FIG. 7 is a flowchart of portrait illustration creation processing.
Figure 8A:
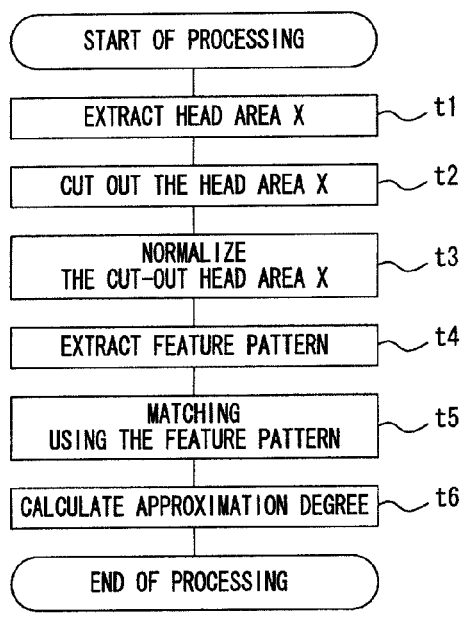
FIGS. 8A and 8B are flowcharts of matching processing and predetermined approximation degree updating processing.
Figure 8B:
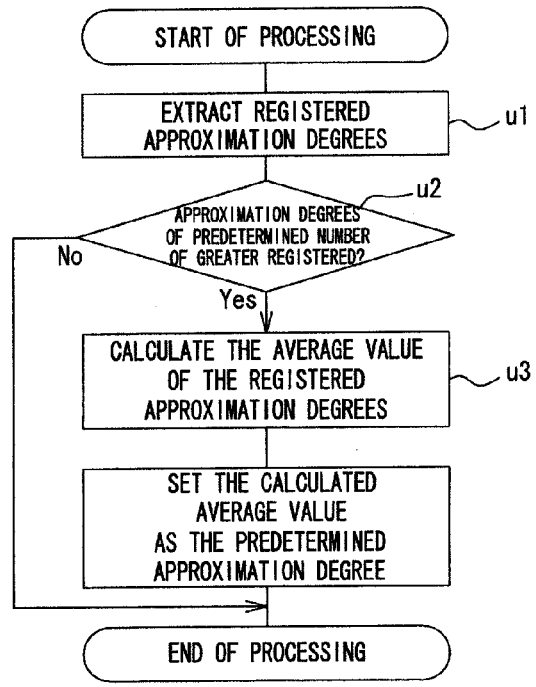

FIG. 7 is a flowchart of the portrait illustration creation processing executed by the portrait illustration creation system 1. FIGS. 8A and 8B show flowcharts of the matching processing and the predetermined approximation degree updating processing executed by the portrait illustration creation system 1.

Figure 11:
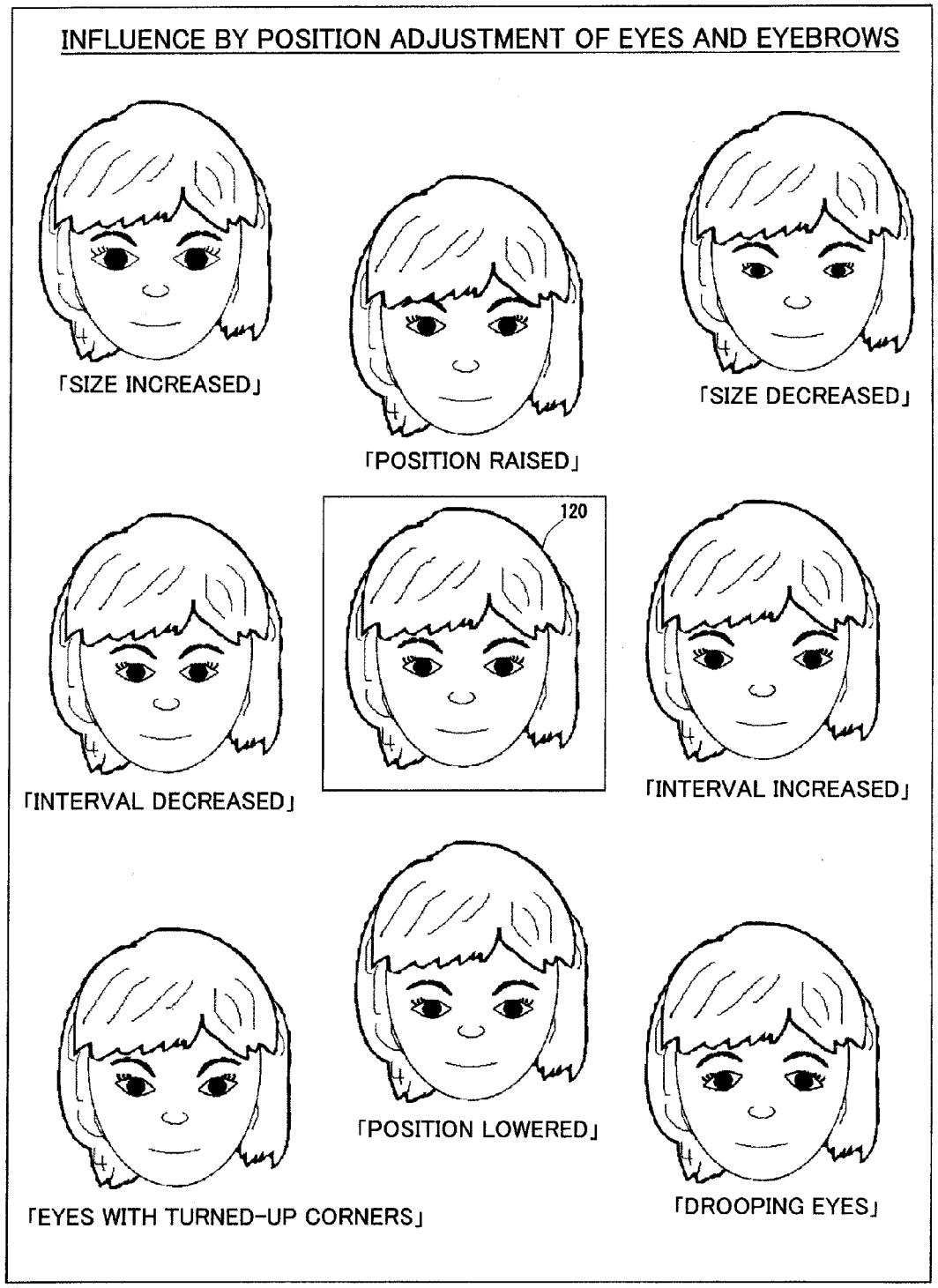
FIG. 11 shows an influence exerted by position adjustment of parts.
Figure 12:
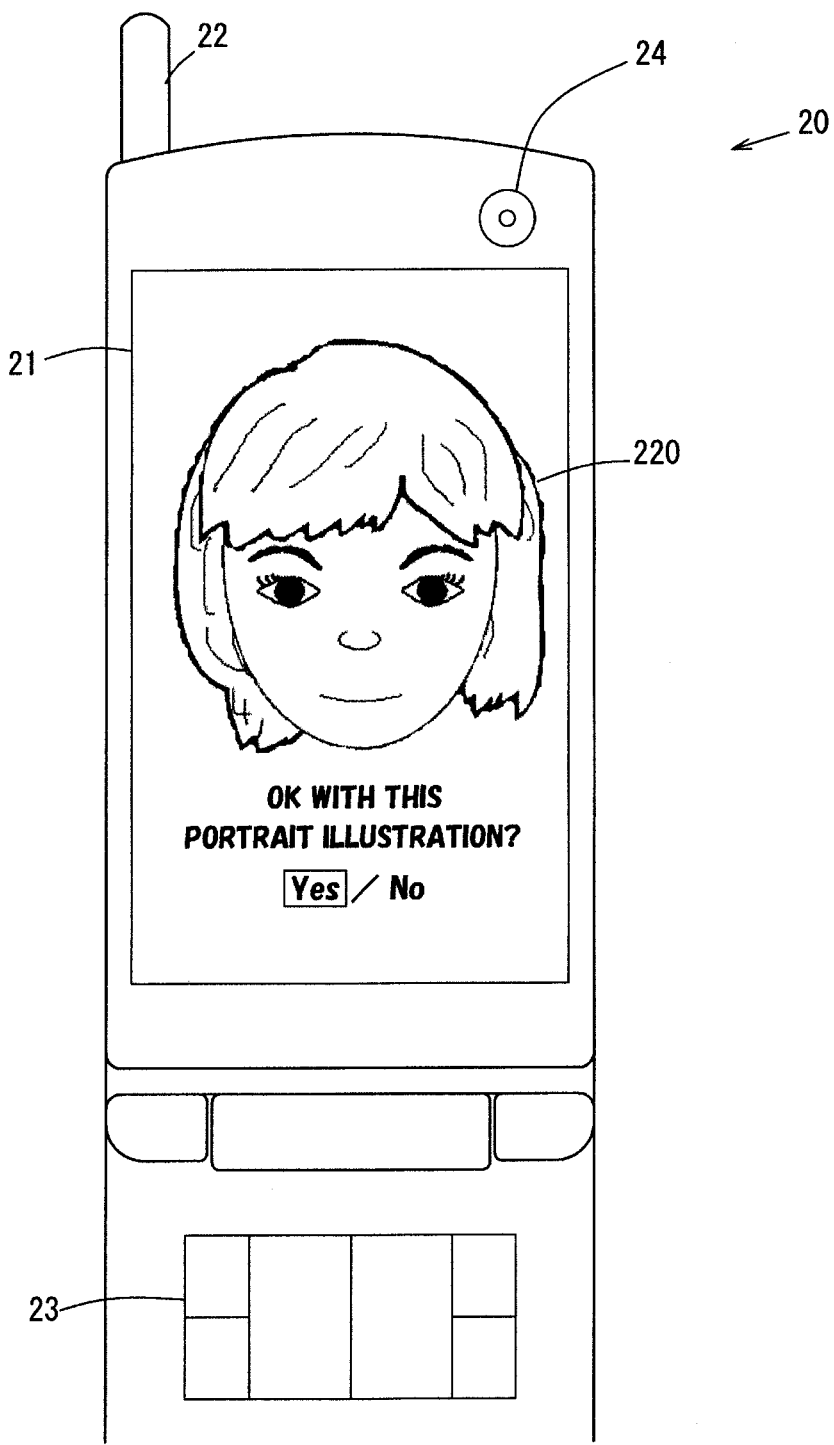
FIG. 12 shows an operation made on the user mobile phone for the portrait illustration creation.

FIG. 9 and FIGS. 10A-10D show an operation of creating a portrait illustration made on the user mobile phone 20. FIG. 11 shows an influence of the position adjustment of the parts (121 through 127). FIG. 12 shows an operation of creating a portrait illustration made on the user mobile phone 20.

Figure 9:
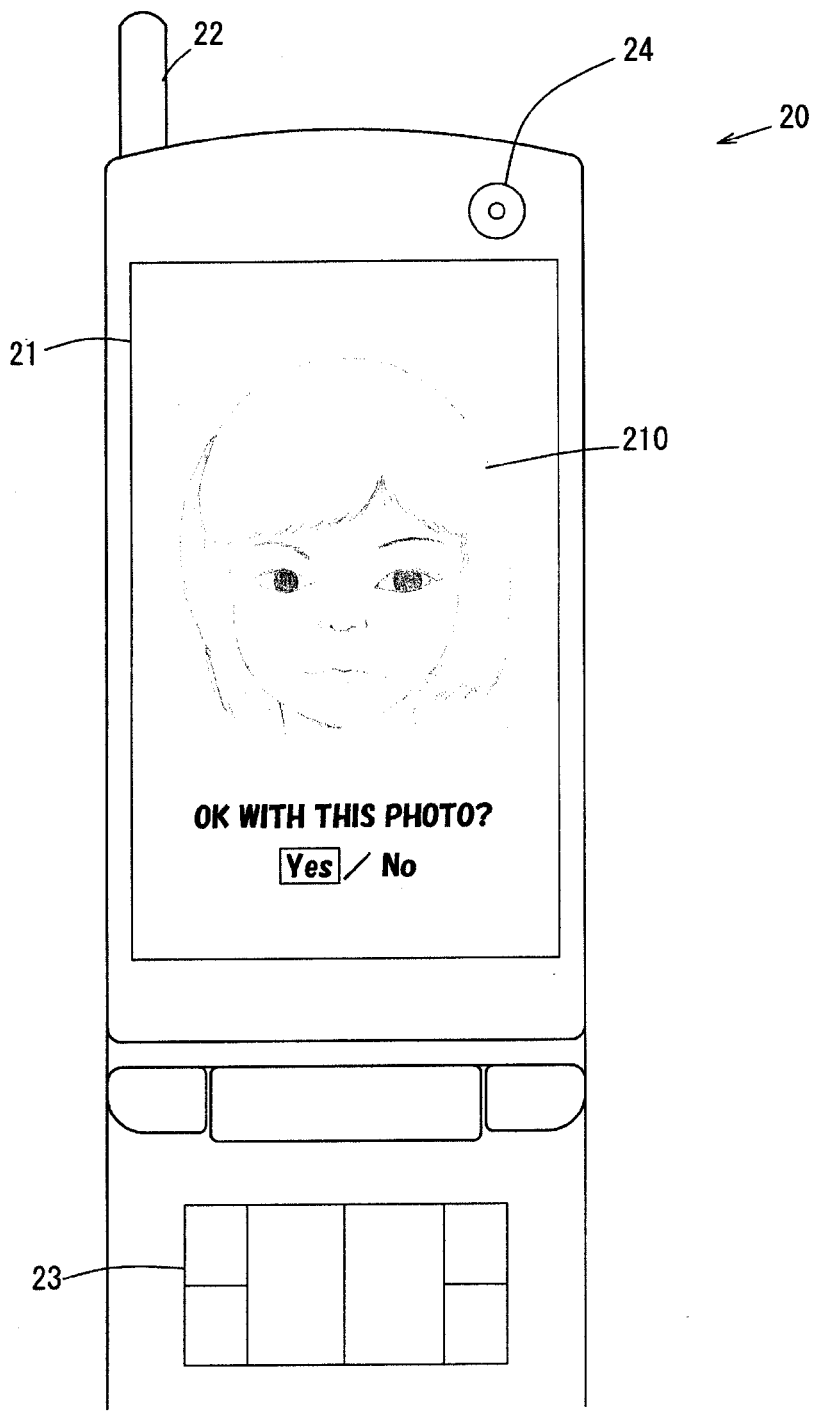
FIG. 9 shows an operation made on a user mobile phone for portrait illustration creation.

First, as shown in FIG. 9, the camera 24 of the user mobile phone 20 is operated to take an image, and the face-photo-data-to-be-illustrated 210 of which the portrait illustration data 220 is desired to be created is transmitted from the user mobile phone 20 by an operation of the user. Upon receiving the face-photo-data-to-be-illustrated 210 from the user mobile phone 20 (step s1), the management server 10 executes the matching program to perform face recognition/matching processing of recognizing a face from the received face-photo-data-to-be-illustrated 210 and extracting the basic face photo data 110 matching the recognized face (step s2).

In more detail, as shown in FIG. 8A, which is a detailed flowchart of the face recognition/matching processing, the management server 10 executes the head area extraction module of the matching program to extract the head area X in the face-photo-data-to-be-illustrated 210 (step t1). The management server 10 cuts out the head area X extracted in step t1 by means of the head area cutout module (step t2), and normalizes the head area X by the head area normalization module so that the feature pattern can be extracted by means of the feature pattern extraction module later (step t3).

The management server 10 executes the feature pattern extraction module to extract the feature pattern from the normalized head area X (step t4). The management server 10 executes the feature pattern matching module to check the extracted feature pattern against the feature pattern of each of the basic face photo data 110 which has been read, using the head area feature pattern ID stored in the basic face management table 51 of the storage device 14 (step t5). The management server 10 further executes the approximation degree calculation module to calculate the approximation degree, which is a numerical value representing each checking result of the feature patterns (step t6).

In this example, the feature pattern is extracted by the Gabor wavelet transformation method and checked by the neural network method. Alternatively, the feature pattern may be extracted by the graph matching method or the like, and checked by the mutual subspace method or the like.

The feature pattern extraction may be facial organ detection of detecting the positions of both ends or the position of the center of a facial organ such as an eye, mouth or the like, or facial organ and profile detection of detecting a profile of a facial organ, jaw or the like in addition to performing the facial organ detection.

When, as a result of the face recognition/matching processing (step s2) executed by the management server 10, there is no matching basic face photo data 110 (step s3: No), this portrait illustration creation processing is terminated.

By contrast, when there is basic face photo data 110 matching the face-photo-data-to-be-illustrated 210 of which a portrait illustration is desired to be created by the user, or when there are a plurality of pieces of matching basic face photo data 110 and the basic face photo data 110 having the highest approximation degree is selected as the basic face photo data to be used (step s3: Yes), the management server 10 determines whether or not the approximation degree calculated in step t6 on such basic face photo data 110 exceeds a predetermined approximation degree A using the determination program (step s4).

When, as a result of the determination, the approximation degree of the basic face photo data 110 is equal to or less than the predetermined approximation degree A (step s4: No), this portrait illustration creation processing is terminated. When the approximation degree of the basic face photo data 110 exceeds the predetermined approximation degree A (step s4: Yes), the basic portrait illustration data 120 corresponding to the basic face photo data 110 is extracted based on the basic portrait illustration ID stored in the basic face management table 51 (FIG. 2A), which associates the basic face photo data 110 with the basic portrait illustration data 120 (step s5).

More specifically, the management server 10 performs matching between the feature pattern of the face-photo-data-to-be-illustrated 210 and the feature pattern of each piece of the basic face photo data 110a through 110e stored on the storage device 14, and calculates the approximation degree thereof.

When the approximation degree with all the feature patterns is 0, it is determined that there is no matching basic face photo data 110 (step s3: No) and this portrait illustration creation processing is terminated.

By contrast, it is assumed that the following approximation degrees, for example, are obtained as a result of performing matching between the feature pattern of the head area X of the face-photo-data-to-be-illustrated 210 and the feature of the head area X of each piece of the basic face photo data 110a through 110e stored on the storage device 14: the approximation degree with the first basic face photo data 110a is 55%, the approximation degree with the second basic face photo data 110b is 40%, the approximation degree with the third basic face photo data 110c is 75%, the approximation degree with the fourth basic face photo data 110d is 0%, and the approximation degree with the fifth basic face photo data 110e is 15%. In this case, it is determined that the face-photo-data-to-be-illustrated 210 matches the third basic face photo data 110c having the highest approximation degree (step s3: Yes).

The approximation degree of 75% with the third basic face photo data 110c exceeds the predetermined approximation degree A, which is set to 60% (step s4: Yes). Therefore, the third basic portrait illustration data 120c, which is the illustration of the basic face of the third basic face photo data 110c, is extracted (step s5).

In this example, the predetermined approximation degree A is set to 60%. The predetermined approximation degree A may set to any value appropriate for operating the system. For example, when the predetermined approximation degree A is set to a higher value, as compared with the case when the predetermined approximation degree A is set to a lower value, the probability at which the portrait illustration data 220 is created is decreased, but the portrait illustration data 220, when created, has a higher degree of similarity.

After extracting the basic portrait illustration data 120 of the matching basic face photo data 110, the management server 10 executes the feature pattern matching module to extract differences between the feature pattern of the face-photo-data-to-be-illustrated 210 and the feature pattern of the basic face photo data 110, and calculates the difference amounts of the differences (step s6).

Specifically, as shown in FIGS. 10A-10D, the differences of the face-photo-data-to-be-illustrated 210 against the third basic face photo data 110c are the size of eyes 216, interval D1' between the eyes 216, interval D2' between the eyebrows 217, the position of a nose 214, and the position of a mouth 215.

The difference amounts of the above-mentioned differences are as follows: each of the eyes 216 of the face-photo-data-to-be-illustrated 210 is smaller by 5% than each of eyes 116 of the matching third basic face photo data 110c, and the interval D1' between the right eye 216a and the left eye 216b is larger by 15% than interval D1 between a right eye 116a and a left eye 116b.

The interval D2' between the right eyebrow 217a and the left eyebrow 217b of the face-photo-data-to-be-illustrated 210 is larger by 15% than interval D2 between a right eyebrow 117a and a left eyebrow 117b of the third basic face photo data 110c. The position of the nose 214 with respect to a profile 211 is higher by 10% than the position of a nose 114 with respect to a profile 111 of the third basic face photo data 110c. The position of the mouth 215 with respect to the profile 211 is lower by 10% than the position of a mouth 115 with respect to the profile 111 of the third basic face photo data 110c.

As described above, after calculating, in step s6, the differences and the difference amounts between the matching basic face photo data 110 and the face-photo-data-to-be-illustrated 210, the management server 10 determines whether or not the difference amounts of the differences each exceed a predetermined difference amount B using the determination program.

When, as a result of the determination performed using the determination program, there are differences having a difference amount exceeding the predetermined difference amount B (step s7: Yes), the management server 10 prioritizes such differences based on the part weighting management table 53 (see FIG. 3A). Then, the management server 10 adjusts the positions of the parts of the basic portrait illustration data 120 using the part position adjustment program, so that the difference amounts become equal to or less than the predetermined difference amount B (step s9).

In this example, the position adjustment is performed on the parts corresponding to the three largest differences among the prioritized differences. Owing to this, the portrait illustration data 220 which appropriately represents the feature of the face-photo-data-to-be-illustrated 210 can be created without significantly changing the overall balance of the basic portrait illustration data 120 corresponding to the basic face photo data 110 having the high approximation degree, and while the increase of the load on the system caused by the position adjustment is suppressed.

Specifically, the predetermined difference amount B is set to 10%. In this example, the size of the eyes 216, the interval D1' between the eyes 216, the interval D2' between the eyebrows 217, the position of the nose 214, and the position of the mouth 215 are provided as the differences. The four differences except for the size of the eyes 216, which has a difference amount of 5%, have difference amounts exceeding the predetermined difference amount B (step s7: Yes).

The four differences having difference amounts exceeding the predetermined difference amount B are prioritized in the following order based on the weighting which is set in the part weighting management table 53: the interval D1' between the eyes 216, the interval D2' between the eyebrows 217, the position of the mouth 215, and the position of the nose 214.

Figure 10A:
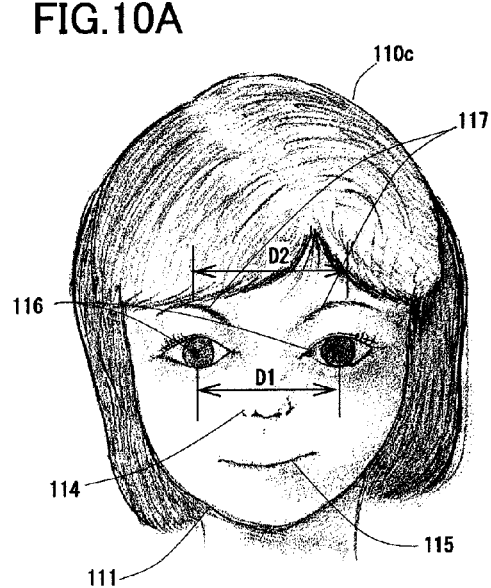
FIGS. 10A, 10B, 10C, and 10D show the portrait illustration creation processing.
Figure 10B:
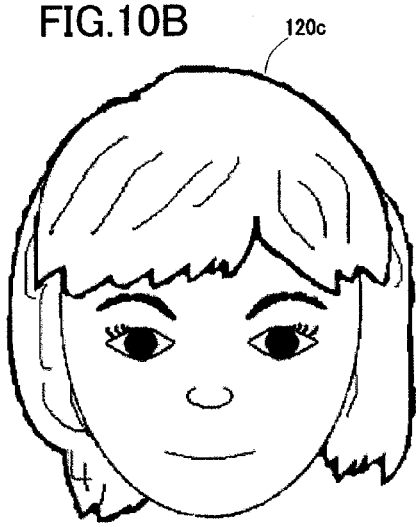
Figure 10C:
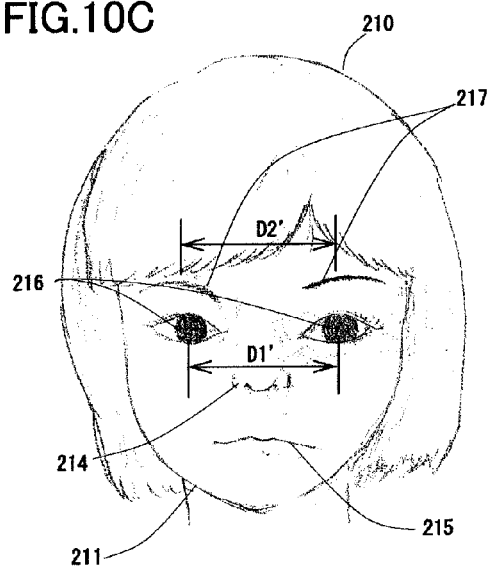
Figure 10D:
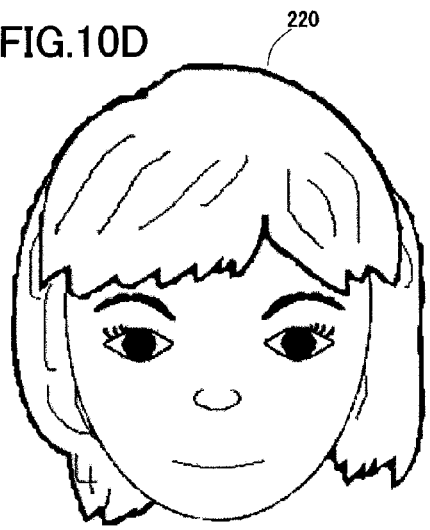

Therefore, in this example in which the position adjustment is performed on the parts corresponding to the three largest differences, the management server 10 adjusts the positions of the right eye part 126a and the left eye part 126b in the basic portrait illustration data 120 shown in FIG. 10B to be outer in the width direction so that the interval D1 between the eye parts 126 becomes the interval D1'. Next, the management server 10 adjusts the positions of the right eyebrow part 127a and the left eyebrow part 127b to be outer in the width direction so that the interval D2 between the eyebrow parts 127 becomes the interval D2'. Then, the management server 10 moves the position of the mouth 125 downward with respect to the face profile part 121 (step s9).

The basic portrait illustration data 120 obtained as a result of adjusting the positions of the parts corresponding to the three largest differences among the differences having difference amounts exceeding the predetermined difference amount B as described above is provided as the portrait illustration data 220 (steps s10).

When none of calculated difference amounts of the differences exceeds the predetermined difference amount B (step s7: No), the basic portrait illustration data 120 corresponding to the basic face photo data 110 is provided as the portrait illustration data 220 (step s10).

Then, the management server 10 registers the created portrait illustration data 220 and the face-photo-data-to-be-illustrated 210 on the storage device 14 as the basic portrait illustration data 120 and the basic face photo data 110 of a new basic face. In more detail, as shown in the basic portrait illustration management table 54, the created portrait illustration data 220 is stored as the basic portrait illustration data 120 together with information on the year/month/day on which the data 220 was created and the approximation degree between the basic portrait illustration data 120 and the portrait illustration data 220 calculated at the time of the creation (step s11). As shown in FIG. 12, the created portrait illustration data 220 is transmitted to the user mobile phone 20 (step s12). Then, this portrait illustration creation processing is terminated.

In the above example, after extracting the basic portrait illustration data 120 of the basic face photo data 110 matching the face-photo-data-to-be-illustrated 210, the management server 10 calculates the differences and the difference amounts thereof based on the feature pattern of the face-photo-data-to-be-illustrated 210 and the basic face photo data 110 in step s6. Alternatively, the management server 10 may calculate the difference amounts of the differences using the checking result of the feature patterns provided by the face recognition/matching processing executed in step s2.

The portrait illustration creation system 1 repeatedly executes the above-described portrait illustration creation processing, and stores the created portrait illustration data 220 and the corresponding face-photo-data-to-be-illustrated

210 on the storage device 14 as the basic face photo data 110 and the basic portrait illustration data 120. As a result, the number of pieces of the basic face photo data 110 and the number of pieces of the basic portrait illustration data 120 accumulated in the storage device 14 are increased. The portrait illustration creation system 1 in this state executes the predetermined approximation degree updating processing. With reference to the flowchart in FIG. 8B, the predetermined approximation degree updating processing will be described.

First, the management server 10 executes the following processing using the predetermined approximation degree updating program. Specifically, the management server 10 extracts the approximation degrees of the registered basic portrait illustration data 120 from the basic portrait illustration management table 54 stored in the management DB 14*a* (step u1). Then, the management server 10 determines whether or not a predetermined number or greater of approximation degrees have been registered after the immediately previous predetermined approximation degree updating processing was executed, using the determination program. When the number of approximation degrees registered after the immediately previous predetermined approximation degree updating processing was executed is less than the predetermined number (step u2: No), this predetermined approximation degree updating processing is terminated.

By contrast, when the number of approximation degrees registered after the immediately previous predetermined approximation degree updating processing was executed is equal to or greater than the predetermined number (step u2: Yes), the management server 10 calculates an average value of the approximation degrees extracted in step u1 (step u3), sets the calculated average value as a new predetermined approximation degree A (step u4), and then terminates this predetermined approximation degree updating processing.

As described above, the portrait illustration creation system 1 includes the management DB 14*a*, in which a plurality of patterns of face photo data used as the base data are stored as the basic face photo data 110, and the basic portrait illustration data 120, which is an illustration of each of the basic faces is stored together with information associating the basic portrait illustration data 120 with the basic face photo data 110.

The management server 10 is structured to execute the matching program for recognizing the face-photo-data-to-be-illustrated 210 as a photo of a face of which a portrait illustration is desired to be created, performing matching between the face-photo-data-to-be-illustrated 210 and the plurality of pieces of basic face photo data 110 stored in the management DB 14*a*, and extracting the basic face photo data 110 having a high approximation degree (steps s2 and s5). The management server 10 is further structured to output the basic portrait illustration data 120, associated with the basic face photo data 110 extracted by the matching program, as the portrait illustration data 220 in step s12.

As described above, the portrait illustration creation system 1 can create a portrait illustration having a high degree at which the user or a person looking at the created portrait illustration feels that the created portrait illustration is similar, namely, having a high degree of similarity, with a simple system configuration.

In more detail, the portrait illustration creation system 1 operates as follows. The basic face photo data 110 on basic faces is stored in the management DB 14*a*, which is the storage means. Also, basic portrait illustration data, which is an illustration of each of the basic faces, is stored as the basic portrait illustration data 120 in the management DB 14*a*. Matching between the face-photo-data-to-be-illustrated 210 of which a portrait illustration is desired to be created, and the basic face photo data 110 is performed. Using the basic portrait illustration data 120 of the basic face photo data 110 having a high approximation degree, the portrait illustration data 220 of the face-photo-data-to-be-illustrated 210 is created and output. Therefore, a portrait illustration having a higher degree of similarity can be created easily.

In more detail, the basic portrait illustration, which is an illustration of the basic face, is created as a result of, for example, mild deformation of the basic face. Therefore, features of the basic face such as "having big eyes" or "having drooping eyes" are reflected on the basic portrait illustration. Thus, the basic portrait illustration has a high degree of similarity. The portrait illustration data 220 is created using the basic portrait illustration data 120 corresponding to the basic face represented by the basic face photo data 110 having a high approximation degree with the face-to-be-illustrated represented by the face-photo-data-to-be-illustrated 210 of which a portrait illustration is desired to be created. Therefore, the portrait illustration data 220 which indirectly reflects the features of the face-to-be-illustrated and has a high degree of similarity can be created easily.

Accordingly, as compared with the case where, for example, the shape of the entire face-to-be-illustrated is recognized and the portrait illustration data is created based on the recognized shape, the portrait illustration data 220 having a higher degree of similarity can be created with a smaller load on the system. In more detail, in the case where the portrait illustration data is created based on the recognized shape of the face-to-be-illustrated, the portrait illustration can be created realistically. However, the features of the face-to-be-illustrated are not reflected. Therefore, the degree at which the user or a person looking at the created portrait illustration data feels that the created portrait illustration data is similar is low. In the case where the portrait illustration data is created based on the recognized shape of the entire face-to-be-illustrated, the load on the system caused by the shape recognition and creation of the illustration data performed based on the recognized shape is large.

For example, in the case where a matching degree between facial parts of a face-to-be-illustrated and a plurality of types of facial parts registered in a database is determined based on feature amounts of the facial parts of face-to-be-illustrated and the portrait illustration data 220 is created using the registered parts having a matching degree of a certain level or higher, it is difficult to reflect the entire balance or features of the face-to-be-illustrated. The degree at which the user or a person looking at the portrait illustration data feels that the portrait illustration data is similar is low.

By contrast, with the portrait illustration creation system 1 according to the present invention, the basic face photo data 110 on each of basic faces and the basic portrait illustration data 120, which is an illustration of each of the basic faces, are stored as a pair on the storage device 14; matching between the face-photo-data-to-be-illustrated 210 of which the portrait illustration 220 is desired to be created, and the basic face photo data 110, is performed; and using the basic portrait illustration data 120 of the basic face photo data 110 having a high approximation degree, the portrait illustration data 220 of the face-photo-data-to-be-illustrated 210 is created and output. Therefore, a portrait illustration having a higher degree of similarity can be created easily with a smaller load on the system.

Matching is performed between the face-to-be-illustrated represented by the face-photo-data-to-be-illustrated 210 of which a portrait illustration is desired to be created, and the basic faces represented by the basic face photo data 110.

Namely, matching is performed between the face photos, i.e., between the same type of materials. Therefore, as compared with the case where, for example, direct matching is performed between the face-photo-data-to-be-illustrated 210 and the basic portrait illustration data 120, which is an illustration of each of the basic faces or an illustration of parts, the matching can be performed with higher precision.

The basic portrait illustration data 120 as an illustration of a basic face is formed of a combination of a plurality of parts (121 through 127). Therefore, as compared with the case where, for example, a matching degree between facial parts of a face-to-be-illustrated and a plurality of types of facial parts registered in a database is determined based on feature amounts of the facial parts of the face-to-be-illustrated and then the portrait illustration data is created using the registered parts having a matching degree of a certain level or higher, the portrait illustration data 220 which is more balanced entirely can be created and also the load on the system caused by the creation of the portrait illustration data 220 can be decreased.

The parts (121 through 127) can be adjusted while the entire balance of the basic portrait illustration data 120, which reflects the features, is kept. Therefore, the portrait illustration data 220 having a high degree of similarity can be created.

The differences which do not much influence the degree of similarity of the portrait illustration are not adjusted, and only the parts (121 through 127) having differences of a predetermined amount or greater, namely, only the parts having a large difference amount are adjusted. Owing to this, the portrait illustration data 220 having a higher degree of similarity can be created while the increase of the load on the system caused by the creation of the illustration is suppressed.

As described above, the basic portrait illustration data 120, which is an illustration of a basic face, is formed of a combination of a plurality of parts (121 through 127) and only the parts (121 through 127) having a large difference amount are adjusted. Owing to this, the portrait illustration data 220 which keeps the entire balance and has a higher degree of similarity can be created.

In more detail, in the case where the basic portrait illustration data 120 is used as the portrait illustration data 220, namely, the basic portrait illustration data 120 is the final product, the portrait illustration data 220 indirectly reflects the features of the basic face reflected on the basic portrait illustration data 120.

By contrast, with the portrait illustration creation system 1 according to the present invention, the basic portrait illustration data 120 stored on the storage device 14 is formed of a combination of the parts (121 through 127). The management server 10 executes the part position adjustment program for extracting the differences on the position, size, interval, angle of location, etc. of each of the parts (121 through 127) between the face-photo-data-to-be-illustrated 210 and the basic face photo data 110 (step s6), and adjusting the parts (121 through 127) of the basic portrait illustration data 120, having a difference of a difference amount exceeding the predetermined difference amount B, so that the difference amount becomes equal to or less than the predetermined difference amount B (step s9).

Owing to this, although being created with a simple system configuration, the portrait illustration data 220 directly reflects the features of the face-to-be-illustrated and can have an improved degree of similarity. Namely, with the portrait illustration creation system 1 according to the present invention, the basic portrait illustration data 120 is merely means for creating the portrait illustration data 220. The portrait illustration data 220 which directly reflects the features of the face-to-be-illustrated is created as a result of adjusting the parts (121 through 127) of the basic portrait illustration data 120, which is the means for creating the portrait illustration data 220, and is provided as the final product. Thus, the portrait illustration having a higher degree of similarity can be created.

The parts of the basic portrait illustration data 120 include at least the face profile part 121, a hair style part, the mouth part 125, the nose part 124, the eye part 126, and the eyebrow part 127. The eye part 126 and the eyebrow part 127 include the right parts (126a, 127a) and the left parts (126b, 127b), and has information on the standard intervals D1 and D2 between the right parts (126a, 127a) and the left parts (126b, 127b) and also information on the rotation centers c around which the right parts (126a, 127a) and the left parts (126b, 127b) respectively rotate.

In the portrait illustration creation system 1, the management server 10 which executes the part position adjustment program (step s9) is structured to be capable of adjusting the size and the position of each of the hair style parts (122, 123), the mouth part 125 and the nose part 124 with respect to the face profile part 121. The management server 10 is also structured to be capable of adjusting the size and the position of each of the eye part 126 and the eyebrow part 127 with respect to the face profile part 121 and also adjusting the standard intervals D1 and D2 and the rotation angle of each of the eye part 126 and the eyebrow part 127 around the rotation centers c.

As shown in FIG. 11, the impression provided by the basic portrait illustration data 120 is significantly changed by adjusting the sizes, the positions, the standard intervals and the rotation angles of the eye part 126 and the eyebrow part 127. By adjusting the parts in this manner, the degree of similarity can be significantly improved while the balance of the portrait illustration is kept.

The eye part 126 includes the right eye part 126a and the left eye part 126b, and the eyebrow part 127 includes the right eyebrow part 127a and the left part 127b. The sizes and the positions of these eye parts and the eyebrow parts with respect to the face profile part 121 are adjusted, and also the standard intervals D1 and D2 between the right parts (126a, 127a) and the left parts (126b, 127b) and the rotation angles thereof around the rotation centers c1 and c2 are adjusted. Regarding the mouth part 125 and the nose part 124 which do not much influence on the degree of similarity, only the sizes and the positions thereof with respect to the face profile part 121 are adjusted. Owing to this, the degree of similarity of the portrait illustration data 220 can be drastically improved while the increase of the load on the system caused by the adjustment of the parts is suppressed.

The portrait illustration creation system 1 includes the part weighting management table 53 regarding the weighting performed on the parts based on the influence thereof on the portrait illustration.

The management server 10 which executes the part position adjustment program (step s9) is structured to, when there are a plurality of parts having a difference of a difference amount exceeding the predetermined difference amount B as extracted in step s6, adjust the parts in accordance with the weighting performed in accordance with the part weighting management table 53.

Owing to this, as shown in FIG. 11, the eye part 126 and the eyebrow part 127, which significantly influence the basic portrait illustration data 120, are adjusted with priority. Therefore, the degree of similarity of the portrait illustration data 220 can be improved while the increase of the load on the system caused by the adjustment of the parts is further suppressed.

The management server 10 is structured to calculate the approximation degree between the basic face photo data 110 extracted in step s2 and the face-photo-data-to-be-illustrated 210 by executing the feature pattern matching module (step t6) and determine whether or not the calculated approximation degree exceeds the predetermined approximation degree A by the determination program.

The portrait illustration creation system 1 further includes the basic portrait illustration management table 54 for storing the face-photo-data-to-be-illustrated 210 and the portrait illustration data 220 in association with each other. The management server 10 is structured to execute the predetermined approximation degree updating processing (steps u1 through u4) of updating the predetermined approximation degree A in accordance with the approximation degrees of a predetermined number or greater which are stored in the basic portrait illustration management table 54, using the predetermined approximation degree updating program.

Owing to this, the face-photo-data-to-be-illustrated 210 and the portrait illustration data 220 can be stored as the basic face photo data 110 and the basic portrait illustration data 120 of a new basic face. Therefore, the number of patterns of the basic faces is increased. Thus, the precision of the matching can be improved, and the portrait illustration data 220 having a higher degree of similarity can be created.

The number of the registered patterns of the basic faces is increased, and thus the predetermined approximation degree A, based on which the determination on the approximation degree is made by approximation degree determination means, is improved based on the achievements provided by the approximation degree. Owing to this, the portrait illustration data 220 having a higher degree of similarity can be created.

In the above description, one piece of basic portrait illustration data 120 is registered on the storage device 14 for one piece of basic face photo data 110. Alternatively, a plurality of pieces of illustration data 120 may be registered for one piece of basic face photo data 110. In more detail, for example, for one piece of basic face photo data 110, a plurality of pieces of basic portrait illustration data 120 different in creation style or brushwork may be registered. Even with the same brushwork, a plurality of pieces of basic portrait illustration data 120 different in orientation or posture may be registered. Owing to this, it is possible to create the portrait illustration data 220 in compliance with the taste of the user wishing to have the portrait illustration data 220 created, and thus the satisfaction degree of the user can be improved. In this case, selection means may be provided for allowing the user to select the basic portrait illustration data 120 when the basic portrait illustration data 120 corresponding to the basic face photo data 110 matching the face-photo-data-to-be-illustrated 210 is extracted.

The portrait illustration creation system 1 includes the transmission/receiving device for receiving the face-photo-data-to-be-illustrated 210 via the Internet 40 from the user mobile phone 20 of the user wishing to have a portrait illustration created. In step s12, the management server 10 transmits the portrait illustration data 220 to the user mobile phone 20. The user can transmit the face-photo-data-to-be-illustrated 210 of which a portrait illustration is desired to be created via the Internet 40 and receive the created portrait illustration data 220 by the user mobile phone 20. Therefore, the convenience is improved.

The portrait illustration creation system 1 may be structured to terminate the portrait illustration creation processing after transmitting the portrait illustration data 220 to the user mobile phone 20 in step s12 and then receiving the information that the user has accepted the portrait illustration data 220. In such a case, when the information that the user has rejected the portrait illustration data 220, the portrait illustration data 220 may be adjusted by adopting the adjustment operation made by the user.

In the above example, the portrait illustration data 220 is created from the face-photo-data-to-be-illustrated 210 using the user mobile phone 20 of the user. Alternatively, the portrait illustration data 220 may be created from the face-photo-data-to-be-illustrated 210 using the user terminal 30. In such a case also, substantially the same effect as above can be provided.

The user terminal 30 may be a terminal of a person who uses the portrait illustration data 220 created using the user mobile phone 20, not the user of the user mobile phone 20. In such a case, the user of the portrait illustration data 220 can allow the portrait illustration data 220 to be displayed on an object specifying the user.

In more detail, in the case where the user terminal 30 is, for example, a terminal used by a pharmacy which prepares a medicine in accordance with a prescription issued by a medical doctor who has examined the user, the user terminal 30 receives the portrait illustration data 220 together with the prescription from the user, and prints the portrait illustration data 220 on a medicine bag, of the medicine provided in accordance with the prescription, together with the information on the name as well as the dosage and administration by means of the printer device 35.

Owing to this, even when, for example, the pharmacist who has received the prescription is different from the pharmacist who hands the medicine to the user, the second pharmacist can check the portrait illustration data 220 printed on the medicine bag and thus can prevent the medicine from being handed to a wrong patient. In the case where, for example, there are patients of the same gender, the same generation and the same name, the pharmacist cannot prevent the medicine to be handed to a wrong patient by merely checking the gender, age and the name. However, by the pharmacist checking the portrait illustration data 220 printed on the medicine bag, the possibility of the medicine being handed to a wrong patient can be drastically reduced.

The object specifying the user may be, for example, a package of a drip used in a hospital in which a large number of patients are treated, a company employee ID, a member ID, a credit card or the like, instead of the medicine bag. In the case where it is difficult to directly print the portrait illustration data 220 on such an object, the portrait illustration data 220 may be printed on a seal and the seal may be pasted on the object.

Figure 13:
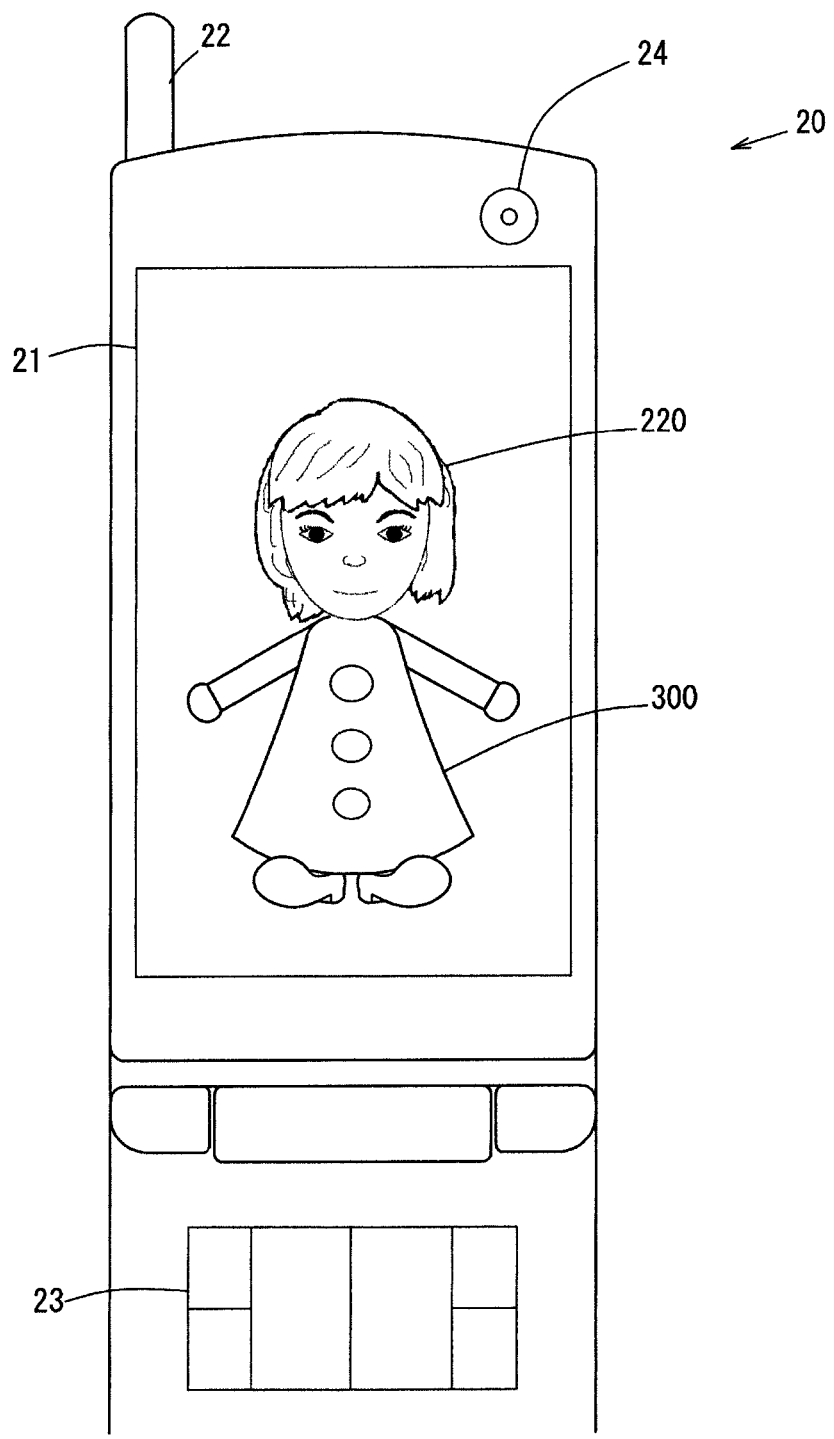
FIG. 13 shows an operation made on the user mobile phone for the portrait illustration creation.

As shown in FIG. 13, the portrait illustration creation system 1 described above may be structured to create an electronic character 300 of the user based on the created portrait illustration data 220. The electronic character 300, for example, acts as the other self of the user in a web community or the like, and a face thereof is the portrait illustration data 220.

Owing to this, the user can have the electronic character 300 similar to himself/herself created and, for example, use the electronic character 300 in a web community. Therefore, the satisfaction degree of the user can be improved.

The portrait illustration creation system 1 may be structured to be capable of allowing the user to select the physique, attire or the like of the electronic character 300.

In the above embodiment, matching is performed between the feature pattern of the entire head area X in the face-photo-data-to-be-illustrated 210 and the feature pattern of the entire head area X in each of the basic face photo data 110 stored on the storage device 14, the basic portrait illustration data 120 corresponding to the basic face photo data 110 having a high approximation degree is extracted, and thus the portrait illustration data 220 is created. Alternatively, the portrait illustration data 220 may be created as follows: the hair area Y in the face-photo-data-to-be-illustrated 210 is extracted, the shape of the hair area Y is recognized, a shape-recognized hair part 122a is created based on the recognized shape, and the basic portrait illustration data 120 is combined with the shape-recognized hair part 122a to create the portrait illustration data 220.

Figure 14:
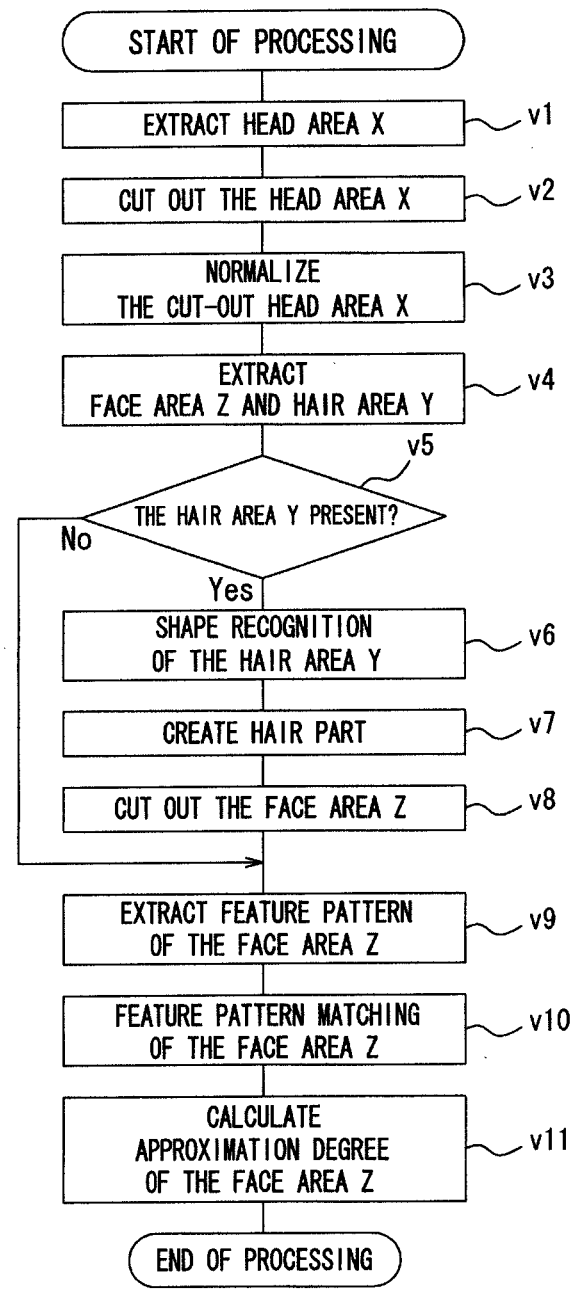
FIG. 14 is a flowchart of hair shape recognition processing and face area matching processing.
Figure 16:
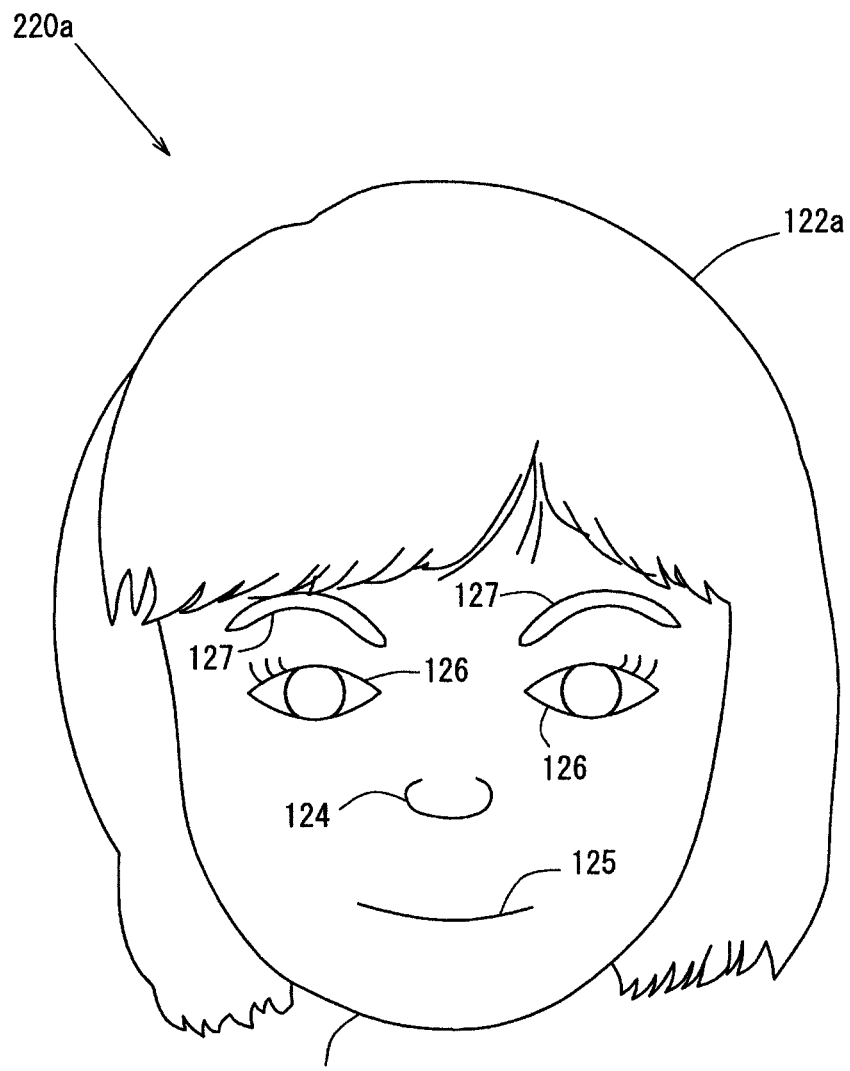
FIG. 16 shows a created portrait illustration provided as a result of the hair shape recognition processing and the face area matching processing.

Hereinafter, with reference to FIG. 14 through FIG. 16, portrait illustration creation processing using the shape-recognized hair part 122a will be described. FIG. 14 is a flowchart of hair shape recognition processing and face area matching processing. FIG. 15 shows the hair shape recognition processing. FIG. 16 shows a portrait illustration obtained as a result of the hair shape recognition processing and the face area matching processing.

In the case of the portrait illustration creation processing using the shape-recognized hair part 122a, the head area extraction module of the matching program stored on the storage device 14 extracts the head area X in the face-photo-data-to-be-illustrated and also extracts the hair area Y and the face area Z from the head area X. The hair area Y and the face area Z are extracted from the head area X by a conventional area extraction method. For example, the hair area Y and the face area Z may be extracted from the extracted head area X based on the color difference between the hair area Y and the face area Z.

Similarly, the head area cutout module cuts out the head area X, the hair area Y and the face area Z extracted from the head area extraction module. The feature pattern extraction module extracts a feature pattern from the face area Z cut out by the head area cutout module. The feature pattern matching module compares and performs matching between the feature pattern of the face area Z in the face-photo-data-to-be-illustrated 210 extracted by the feature pattern extraction module and the feature pattern of the face area Z in each of the basic face photo data 110 registered on the storage device 14.

In the case of the portrait illustration creation processing using the shape-recognized hair part 122a, the storage device 14 stores a hair shape recognition program and a shape-recognized hair part creation program.

The hair shape recognition program is for recognizing the shape of the hair area Y. The shape of the hair area Y is recognized by a conventional area extraction method, which will not be described.

The shape-recognized hair part creation program is for creating the shape-recognized hair part 122a based on the shape of the hair area Y recognized by the hair shape recognition program.

The portrait illustration creation system 1, including the above-described programs and modules, executes the portrait illustration creation processing as described above (see FIG. 7) using the shape-recognized hair part 122a. It should be noted that, however, as shown in FIG. 14, the portrait illustration creation processing using the shape-recognized hair part is different from that shown in FIG. 7 on the face recognition/matching processing executed in step s2.

In more detail, as described above, upon receiving the face-photo-data-to-be-illustrated 210 (see FIG. 9) taken by the camera 24 of the user mobile phone 20 (step s1), the management server 10 executes the matching program to perform face recognition/matching processing of recognizing a face from the received face-photo-data-to-be-illustrated 210 and extracting the matching basic face photo data 110 (step s2).

In this step, like in the face recognition/matching processing shown in FIG. 8A, in the portrait illustration creation processing using the shape-recognized hair part 122a, the head area extraction module of the matching program is executed to extract the head area X in the face-photo-data-to-be-illustrated 210 (step v1). The head area X extracted in step v1 is cut out by the head area cutout module (step v2), and is normalized by the head area normalization module (step v3).

The management server 10 again executes the head area extraction module to extract the hair area Y (FIG. 4) and the face area Z (FIG. 4) from the head area X (FIG. 4) normalized by the head area normalization module (step v4). After step v4, the management server 10 determines whether or not the hair area Y is present. When the hair area Y is present (step v5: Yes), the management server 10 recognizes the shape of the hair area Y extracted by the head area extraction module, using the hair shape recognition program (step v6). Then, as shown in FIG. 15, the management server 10 executes the shape-recognized hair part creation program to create the shape-recognized hair part 122a based on the shape of the hair area Y recognized in step v6 (step v7).

Specifically, as shown in FIG. 15, the profile of the hair area Y in the face-photo-data-to-be-illustrated 210 is defined by a plurality of points P, and the shape of the hair area Y is recognized by an external shape line L obtained by connecting the points P.

As shown in FIG. 15, the shape-recognized hair part 122a is created based on the shape of the hair area Y recognized by the plurality of points P and the external shape line L.

After the shape-recognized hair part 122a is created in this manner in step v7, or when the hair area Y is not recognized for the reason that the face-to-be-illustrated represented by the face-photo-data-to-be-illustrated 210 is of a skin head or that the color tones of the hair area Y and the face area Z are not clear (step v5: No), the management server 10 cuts out the face area Z extracted in step v4 by the head area cutout module (step v8). When the hair area Y is not recognized in step v5, the face area Z cut out in step v8 matches the head area X.

The management server 10 executes the feature pattern extraction module to extract the feature pattern from the face area Z cutout in step v8 (step v9). Then, the management server 10 executes the feature pattern matching module to check the extracted feature pattern against the feature pattern of the face area Z of each of the basic face photo data 110 which has been read, using the face area feature pattern IDs stored in the basic face management table 51 of the storage device 14 (step v10). Then, the management server 10 executes the approximation degree calculation module to calculate the approximation degree, which is a numerical value representing each checking result of the feature patterns (step v11).

In this manner, the management server 10 creates the shape-recognized hair part 122a and also executes the face recognition/matching processing of calculating the approximation degrees, which are numerical values representing the checking results of the feature patterns in the face area Z. Then, the management server 10 performs step s3 shown in FIG. 7. When there is the basic face photo data 110 matching the face-photo-data-to-be-illustrated 210 of which a portrait illustration is desired by the user to be created, the management server 10 determines whether or not the approximation degree of the face area Z in such basic face photo data 110 calculated in step v11 exceeds the predetermined approximation degree A (step s4).

When, as a result of the determination, the approximation degree of the basic face photo data 110 is equal to or less than the predetermined approximation degree A (step s4: No), this portrait illustration creation processing is terminated. When the approximation degree of the basic face photo data 110 exceeds the predetermined approximation degree A (step s4: Yes), the basic portrait illustration data 120 corresponding to the basic face photo data 110 is extracted with the rear hair part 122 and the front hair part 123 being replaced with the shape-recognized hair part 122*a* (step s5). The steps after step s5 (steps s6 through s12) are as described above and will not be described.

As described above, the portrait illustration creation system 1 which performs the portrait illustration creation processing using the shape-recognized hair part 122*a* provides an effect of creating portrait illustration data 220*a* having a higher degree of similarity as shown in FIG. 16 with a simple system configuration, in addition to the effect provided by the portrait illustration creation system 1 which performs the portrait illustration creation processing without using the shape-recognized hair part 122*a*.

In more detail, the hair style can be easily changed or the hair can be made longer or shorter even for the same person. Therefore, in order to create the portrait illustration data having a high degree of similarity with high precision, basic portrait illustration data 120 corresponding to a basic face of a plurality of hair styles needs to be registered. This increases the scale of the storage device 14.

By contrast, the portrait illustration creation system 1, which executes the portrait illustration creation processing using the shape-recognized hair part 122*a*, creates the shape-recognized hair part 122*a* based on the shape of the hair, which can be changed easily, as follows. The shape of the hair area Y, which is the hair part of the face-to-be-illustrated recognized from the basic portrait illustration data 120, is recognized by the hair shape recognition program in step v6. Then, the shape-recognized hair part 122*a* is created in step v7 by the shape-recognized hair part creation program. Therefore, as compared with the case where the shape of the entire head area X is recognized to create the portrait illustration, the increase of the load on the system can be decreased. In addition, as compared with the case where the basic portrait illustration data 120 corresponding to the basic face data of a plurality of hair styles is stored in the management DB 14*a*, the number of patterns to be stored can be decreased. Therefore, the portrait illustration data 220 having high precision and a high degree of similarity can be created with a small scale storage device 14.

The portrait illustration creation system 1, which executes the portrait illustration creation processing using the shape-recognized hair part 122*a* as described above, operates as follows. In step v4, the face area Z, which is an area of the head area X excluding the hair area Y, of the face-to-be-illustrated recognized from the face-photo-data-to-be-illustrated 210, and the face area Z of the basic face of each of the basic face photo data 110, are extracted by the head area extraction module. In steps v9 and v10, matching is performed between the face area Z in the face-to-be-illustrated and the face area Z of each basic face by the feature pattern extraction module and the feature pattern matching module of the matching program, and the basic face photo data 110 having a high approximation degree is extracted. Therefore, the portrait illustration data 220*a* having a higher degree of similarity can be created with a simple system configuration.

In more detail, as described above, the hair style can be easily changed or the hair can be made longer or shorter even for the same person. Therefore, the data may not match occasionally even between the photos of the same person when the hair style is changed. However, in steps v9 and v10, matching is performed between the face area Z in the face-to-be-illustrated and the face area Z of each of the basic faces, and the basic face photo data 110 having a high approximation degree is extracted. Therefore, a portrait illustration can be created based on the portrait illustration data 220*a* which reflects the features of the face area Z and has a high degree of similarity, without relying on the hair style.

The elements of the present invention and the elements of the above-described embodiment correspond as follows.

The basic face photo data storage means and the associating information storage means of the present invention correspond to the basic face management table 51 stored in the management DB 14*a* of the storage device 14;

the basic face photo data of the present invention corresponds to the basic face photo data 110;

the parts of the present invention corresponds to the face profile part 121, the rear hear part 122, the front hair part 123, the nose part 124, the mouth part 125, the eye part 126, and the eyebrow part 127;

the basic portrait illustration data of the present invention corresponds to the basic portrait illustration data 120;

the basic portrait illustration data storage means of the present invention corresponds to the first basic facial part management table 52 stored in the management DB 14*a* of the storage device 14;

the associating information of the present invention corresponds to the basic portrait illustration ID stored in the basic face management table 51;

the face-photo-data-to-be-illustrated of the present invention corresponds to the face-photo-data-to-be-illustrated 210;

approximate basic face photo extraction means of the present invention corresponds to the management server 10 which executes the feature pattern extraction module and the feature pattern matching module of the matching program in steps t4, t5, v9 and v10;

the part difference extraction means of the present invention corresponds to the management server 10 which executes the feature pattern matching module in step t5;

the prescribed amount of the present invention corresponds to the prescribed difference amount B;

the part adjustment means of the present invention corresponds to the management server 10 which executes the part position adjustment program in step s9;

the portrait illustration output means of the present invention corresponds to the management server 10 which executes the transmission/receiving program in step s12;

the right part of the present invention corresponds to the right eye part 126*a* or the right eyebrow part 127*a;* the left part of the present invention corresponds to the left eye part 126*b* or the left eyebrow part 127*b;* information on the left-right intervals of the present invention corresponds to the standard intervals D;

the hair style part of the present invention corresponds to the rear hair part 122 and the front hair part 123;

the hair shape recognition means of the present invention corresponds to the management server 10 which executes the hair shape recognition program in step v6;

the shape-recognized hair style part of the present invention corresponds to the shape-recognized hair part 122*a;* the shape-recognized hair style part creation means of the present invention corresponds to the management server 10 which executes the shape-recognized hair part creation program in step v7;

the face area extraction means of the present invention corresponds to the management server 10 which executes the head area extraction module in step v4;

the weighting means of the present invention corresponds to the priority order stored in the part weighting management table 53;

the approximation degree calculation means of the present invention corresponds to the management server 10 which executes the approximation degree calculation module in step t6 and v11;

the approximation degree determination means of the present invention corresponds to the management server 10 which executes the determination program in step s4;

the approximation-degree-with-achievements storage means of the present invention corresponds to the basic portrait illustration management table 54;

the predetermined approximation degree updating means of the present invention corresponds to the management server which executes the predetermined approximation degree updating processing (steps u1 through u4) using the predetermined approximation degree updating program;

the user terminal of the present invention corresponds to the user mobile phone 20 or the user terminal 30;

the electric communication line of the present invention corresponds to the Internet 40;

the face-photo-data-to-be-illustrated receiving means of the present invention corresponds to the transmission/receiving device which receives the face-photo-data-to-be-illustrated 210 in step s1;

the portrait illustration data transmission means of the present invention corresponds to the transmission/receiving device which transmits the portrait illustration data 220 or 220a to the user mobile phone 20 in step s12;

the character of the present invention corresponds to the electronic character 300;

the character creation means of the present invention corresponds to the management server 10 of the portrait illustration creation system 1 which creates the electronic character 300;

the character creation system of the present invention corresponds to the portrait illustration creation system 1 which creates the electronic character 300;

the object of the present invention corresponds to the medicine bag of the medicine provided in accordance with the prescription, the package of the drip, the company employee ID, the member ID, or the credit card;

the illustration display means of the present invention corresponds to the printer device 35;

the portrait illustration display system of the present invention corresponds to the portrait illustration creation system 1 which prints the portrait illustration data 220 or 220a by means of the printer device 35; and the portrait illustration creation method of the present invention corresponds to the portrait illustration creation processing.

However, the present invention is not limited to the above-described embodiment and can be carried out in various other embodiments.

The weighting described above is performed for each item of the parts to be adjusted, such as the interval, size, position or the like. Alternatively, the weighting may be performed on the entirety of each part regardless of the item to be adjusted.

The user mobile phone 20 may be, for example, a user terminal such as a camera-equipped mobile phone, a camera-equipped PDA or the like which can be carried around by the user, or a personal computer connectable with imaging means such as a digital camera or the like. Alternatively, a telephone set as a substitute for the user mobile phone 20 may function with a telephone line other than the Internet 40, or a communication line such as a personal computer communication line or the like.

In the predetermined approximation updating processing described above, the average value of the approximation degrees is set as the new predetermined approximation degree A. Alternatively, the predetermined approximation degree A may be increased by a predetermined value or ratio.

In the above description, the system creates the portrait illustration data 220 by performing matching between the feature pattern of the entire head area X in the face-photo-data-to-be-illustrated 210 and the feature pattern of the entire head area X in each of the basic face photo data 110 stored on the storage device 14, and extracting the basic portrait illustration data 120 corresponding to the basic face photo data 110 having a high approximation degree. This system may include hair shape recognition means capable of extracting the hair area Y in the face-photo-data-to-be-illustrated 210, recognizing the shape of the hair area Y, creating the shape-recognized hair part 122a based on the recognized shape, and combining the basic portrait illustration data 120 and the shape-recognized hair part 122a to create the portrait illustration data 220. The system may also include replacement means for replacing the rear hair part 122 and the front hair part 123 in the created portrait illustration data 220 with the shape-recognized hair part 122a created by the hair shape recognition means. Owing to this, the user, upon checking the portrait illustration data 220 once created, can replace the rear hair part 122 and the front hair part 123 with the shape-recognized hair part 122a. Therefore, the satisfaction degree of the user can be further improved.

INDUSTRIAL APPLICABILITY

The present invention is usable for a portrait illustration creation system for creating portrait illustration data based on face photo data of a face of which a portrait illustration is desired to be created.

REFERENCE SIGNS LIST

1 . . . Portrait illustration creation system
10 . . . Management server
14 . . . Storage device
14a . . . Management DB
20 . . . User mobile phone
30 . . . User terminal
35 . . . Printer device
40 . . . Internet
51 . . . Basic face management table
52 . . . First basic facial part management table 52
53 . . . Weighting management table 53
54 . . . Basic portrait illustration management table
110 . . . Basic face photo data
120 . . . Basic portrait illustration data
121 . . . Face profile part
122 . . . Rear hair part
122a . . . Shape-recognized hair part
123 . . . Front hair part
124 . . . Nose part
125 . . . Mouth part 126 ... Eye part
126a ... Right eye part
126b ... Left eye part
127 ... Eyebrow part
127a ... Right eyebrow part
127b ... Left eyebrow part
210 ... Face-photo-data-to-be-illustrated
220, 220a ... Portrait illustration data
300 ... Electronic character
c ... Rotation center
D ... Standard interval
X ... Head area
Y ... Hair area
Z ... Face area

The invention claimed is:

1. A portrait illustration creation system, comprising:
basic face photo data storage means for storing a plurality of pieces of face photo data of basic faces, based on which a portrait illustration is to be created, as basic face photo data;
basic portrait illustration data storage means for storing a plurality of basic portrait illustrations, which are illustrations of the basic faces, as basic portrait illustration data formed of a combination of a plurality of parts;
associating information storage means for storing information which associates the basic face photo data with the basic portrait illustration data;
approximate basic face photo extraction means for recognizing, from face-photo-data-to-be-illustrated which is a photo of a face-to-be-illustrated of which a portrait illustration is desired to be created, the face-to-be-illustrated; performing matching between the face-to-be-illustrated and the basic faces represented by the plurality of pieces of basic face photo data stored on the basic face photo data storage means; and extracting the basic face photo data having a high approximation degree;
part difference extraction means for extracting a difference on each of the parts between the basic face of the basic face photo data extracted by the approximate basic face photo extraction means and the face-to-be-illustrated represented by the face-photo-data-to-be-illustrated;
part adjustment means for making an adjustment on the part having a difference of a difference amount exceeding a predetermined amount, the difference being extracted by the part difference extraction means, wherein the adjustment is made on the part of the basic portrait illustration data associated with the basic face photo data extracted by the approximate basic face photo extraction means so that the difference amount of the difference becomes equal to or less than the predetermined amount; and
portrait illustration data output means for outputting basic portrait illustration data, adjusted by the part adjustment means, as portrait illustration data.

2. A portrait illustration creation system according to claim 1, wherein:
the parts include at least an eye part and an eyebrow part;
the eye part and the eyebrow part each include a right part and a left part and also include information on left-right intervals between the right part and the left part and information on rotation centers around which the right part and the left part are respectively rotated; and
the part adjustment means is capable of adjusting, regarding each of the eye part and the eyebrow part, a size and a position with respect to a head area in the basic portrait illustration data, and also the left-right interval and a rotation angle around the rotation center.

3. A portrait illustration creation system according to claim 1, wherein:
the parts include at least a face profile part, a hair style part, a mouth part, a nose part, an eye part and an eyebrow part;
the eye part and the eyebrow part each include a right part and a left part and also include information on left-right intervals between the right part and the left part and information on rotation centers around which the right part and the left part are respectively rotated;
the part adjustment means is capable of adjusting, regarding each of the hair style part, the mouth part and the nose part, a size and a position with respect to the face profile part; and
the part adjustment means is also capable of adjusting, regarding each of the eye part and the eyebrow part, a size and a position with respect to the face profile part, and also the left-right interval and a rotation angle around the rotation center.

4. A portrait illustration creation system according to claim 3, further comprising:
hair shape recognition means for recognizing a shape of a hair area, which is an area of hair in the face-to-be-illustrated recognized from the face-photo-data-to-be-illustrated; and
shape-recognized hair style part creation means for creating a shape-recognized hair style part based on the shape of the hair recognized by the hair shape recognition means;
wherein the portrait illustration data is created using the shape-recognized hair style part instead of the hair style part.

5. A portrait illustration creation system according to claim 1, further comprising:
face area extraction means for extracting a face area, which is an area of a head area excluding a hair area, from the face-to-be-illustrated recognized from the face-photo-data-to-be-illustrated and each of the basic faces of the basic face photo data;
wherein the approximate basic face photo extraction means performs matching between the face area of the face-to-be-illustrated and the face area of each of the basic faces, and extracts the basic face photo data having a high approximation degree.

6. A portrait illustration creation system according to claim 1, further comprising:
weighting means for performing weighting on the parts based on an influence exerted on a portrait illustration;
wherein when there are a plurality of parts having a difference of a difference amount exceeding the predetermined amount, the difference amount of the difference being calculated by the part difference extraction means, the part adjustment means adjusts each of the parts in accordance with a weight provided by the weighting means.

7. A portrait illustration creation system according to claim 1, further comprising:
approximation degree calculation means for calculating an approximation degree between the basic face photo data extracted by the approximate basic face photo extraction means and the face-photo-data-to-be-illustrated;
approximation degree determination means for determining whether or not the approximation degree calculated by the approximation degree calculation means exceeds a predetermined approximation degree;
approximation-degree-with-achievements storage means for storing the approximation degree in association with the face-photo-data-to-be-illustrated to be stored on the basic face photo data storage means as new basic face photo data and also in association with the portrait illustration data to be stored on the basic portrait illustration data storage means as new basic portrait illustration data; and predetermined approximation degree updating means for updating the predetermined approximation degree in accordance with the approximation degrees of a predetermined number or greater, which are stored on the approximation-degree-with-achievements storage means.

8. A portrait illustration creation system according to claim 1, further comprising:

face-photo-data-to-be-illustrated receiving means for receiving, via an electric communication line, the face-photo-data-to-be-illustrated from a user terminal of a user wishing to have a portrait illustration created;

wherein the portrait illustration data output means includes portrait illustration data transmission means for transmitting the portrait illustration data to the user terminal.

9. The portrait illustration creation system of claim 1, further comprising:

character creation means for creating character information which represents a character of a user for whom a portrait illustration has been created, based on the portrait illustration data.

10. The portrait illustration creation system of claim 1, further comprising:

illustration display means for allowing the portrait illustration data to be displayed on a desired object.

11. A portrait illustration creation system according to claim 4, further comprising:

face area extraction means for extracting a face area, which is an area of a head area excluding the hair area, from the face-to-be-illustrated recognized from the face-photo-data-to-be-illustrated and each of the basic faces of the basic face photo data;

wherein the approximate basic face photo extraction means performs matching between the face area of the face-to-be-illustrated and the face area of each of the basic faces, and extracts the basic face photo data having a high approximation degree.

12. A portrait illustration creation system according to claim 11, further comprising:

weighting means for performing weighting on the parts based on an influence exerted on a portrait illustration;

wherein when there are a plurality of parts having a difference of a difference amount exceeding the predetermined amount, the difference amount of the difference being calculated by the part difference extraction means, the part adjustment means adjusts each of the parts in accordance with a weight provided by the weighting means.

13. A portrait illustration creation system according to claim 12, further comprising:

approximation degree calculation means for calculating an approximation degree between the basic face photo data extracted by the approximate basic face photo extraction means and the face-photo-data-to-be-illustrated;

approximation degree determination means for determining whether or not the approximation degree calculated by the approximation degree calculation means exceeds a predetermined approximation degree;

approximation-degree-with-achievements storage means for storing the approximation degree in association with the face-photo-data-to-be-illustrated to be stored on the basic face photo data storage means as new basic face photo data and also in association with the portrait illustration data to be stored on the basic portrait illustration data storage means as new basic portrait illustration data; and predetermined approximation degree updating means for updating the predetermined approximation degree in accordance with the approximation degrees of a predetermined number or greater, which are stored on the approximation-degree-with-achievements storage means.

14. A portrait illustration creation system according to claim 13, further comprising:

face-photo-data-to-be-illustrated receiving means for receiving, via an electric communication line, the face-photo-data-to-be-illustrated from a user terminal of a user wishing to have a portrait illustration created;

wherein the portrait illustration data output means includes portrait illustration data transmission means for transmitting the portrait illustration data to the user terminal.

15. The portrait illustration creation system according to claim 14, further comprising:

character creation means for creating character information which represents a character of a user for whom a portrait illustration has been created, based on the portrait illustration data.

16. The portrait illustration creation system according to claim 14, further comprising:

illustration display means for allowing the portrait illustration data.

* * * * *